United States Patent

Ang

(10) Patent No.: US 9,817,482 B2
(45) Date of Patent: Nov. 14, 2017

(54) SECURE KEYPAD INCLUDING CONDUCTIVE TRACE

(71) Applicant: VERIFONE, INC., San Jose, CA (US)

(72) Inventor: Thai Wee Ang, Singapore (SG)

(73) Assignee: VeriFone, Inc., San Jose, CA (US)

( * ) Notice: Subject to any disclaimer, the term of this patent is extended or adjusted under 35 U.S.C. 154(b) by 46 days.

(21) Appl. No.: 14/542,864

(22) Filed: Nov. 17, 2014

(65) Prior Publication Data

US 2016/0139678 A1    May 19, 2016

(51) Int. Cl.
| | | |
|---|---|---|
| G06F 3/02 | (2006.01) | |
| G06F 3/023 | (2006.01) | |
| G06F 21/83 | (2013.01) | |

(52) U.S. Cl.
CPC .......... G06F 3/0202 (2013.01); G06F 21/83 (2013.01)

(58) Field of Classification Search
CPC ........ G06F 21/86; G06F 21/83; G06F 3/0414; G06F 2/04886
USPC .......................................... 341/24
See application file for complete search history.

(56) References Cited

U.S. PATENT DOCUMENTS

| | | | | |
|---|---|---|---|---|
| 6,117,539 A | * | 9/2000 | Crotzer | B32B 27/08 428/308.4 |
| 6,646,565 B1 | | 11/2003 | Fu et al. | |
| 6,853,093 B2 | | 2/2005 | Cohen et al. | |
| 7,988,054 B2 | | 8/2011 | Garrido-Gadea et al. | |
| 8,330,606 B2 | | 12/2012 | Avital et al. | |
| 9,013,336 B2 | | 4/2015 | Schulz et al. | |
| 2002/0093489 A1 | * | 7/2002 | Kaikuranta | H03K 17/98 345/169 |
| 2003/0047433 A1 | * | 3/2003 | Moree | G06F 21/83 200/50.01 |
| 2006/0201701 A1 | | 9/2006 | Coleman et al. | |
| 2009/0184850 A1 | * | 7/2009 | Schulz | G06F 1/1626 341/22 |
| 2011/0248860 A1 | * | 10/2011 | Avital | H05K 1/0275 340/652 |
| 2013/0306450 A1 | * | 11/2013 | Wolfe | H01H 9/0264 200/304 |

OTHER PUBLICATIONS

An International Search Report and a Written Opinion both dated Feb. 2, 2016, which issued during the prosecution of Applicant's PCT/US2015/059891.
Notification Concerning Transmittal of International Preliminary Report on Patentability and attached Written Opinion dated Jun. 1, 2017.

* cited by examiner

Primary Examiner — Omer S Khan
(74) Attorney, Agent, or Firm — Hunton & Williams LLP

(57) ABSTRACT

A secure keypad including a housing, a keymat within the housing defining a plurality of depressible keys and including at least one conductive trace traversing at least some of the depressible keys, a key contact board within the housing and being cooperative with the keymat for providing data entry inputs responsive to depression of the depressible keys and a tamper detection circuit coupled to the conductive trace for providing an output indication of tampering with the keypad responsive to a change in the electrical characteristics of the conductive trace resulting from the tampering.

5 Claims, 40 Drawing Sheets

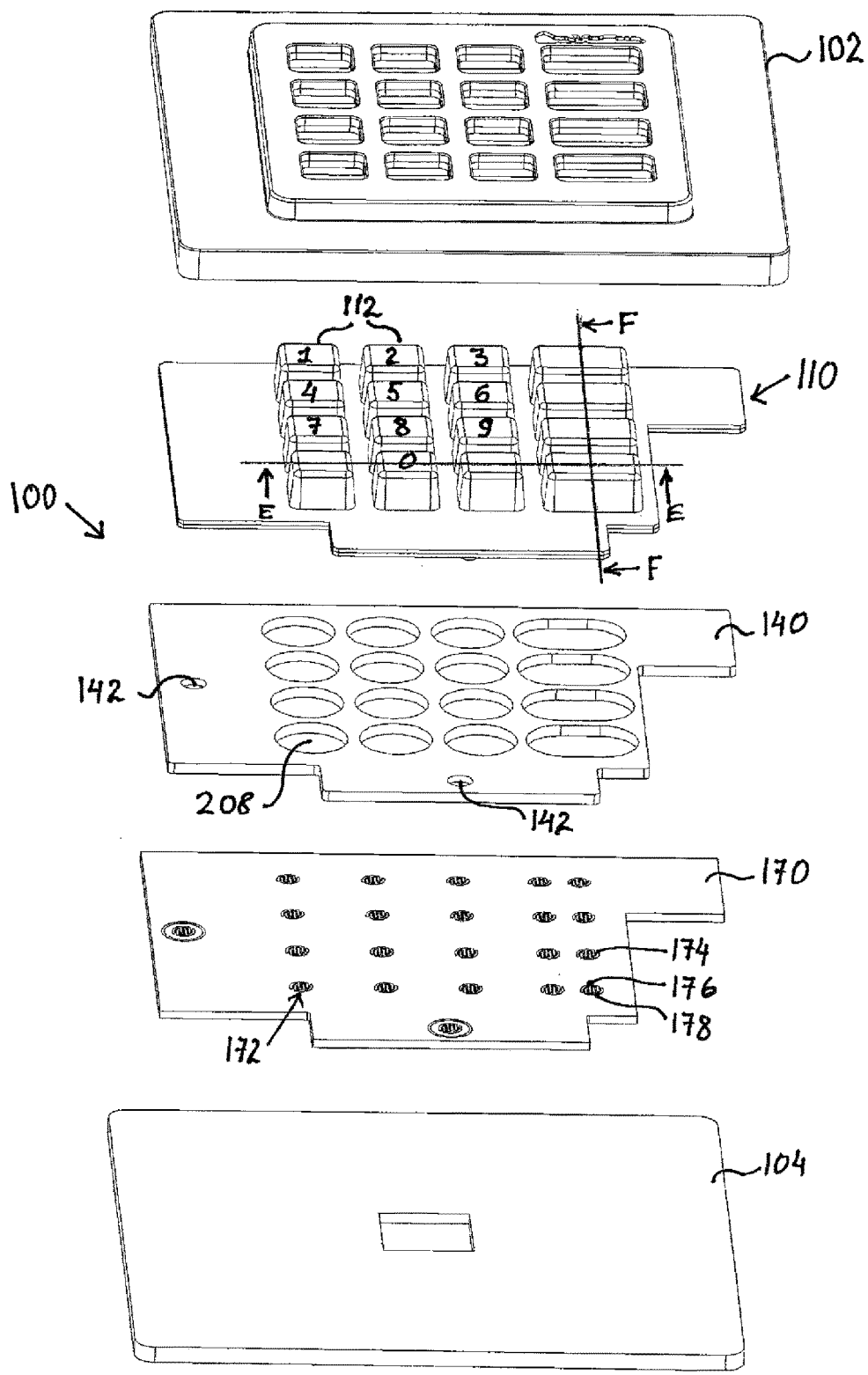

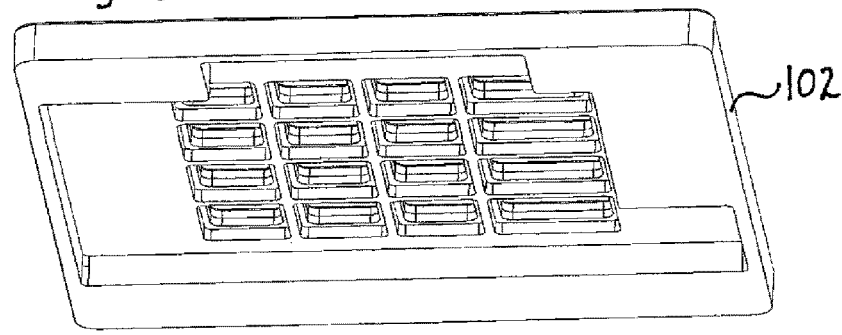
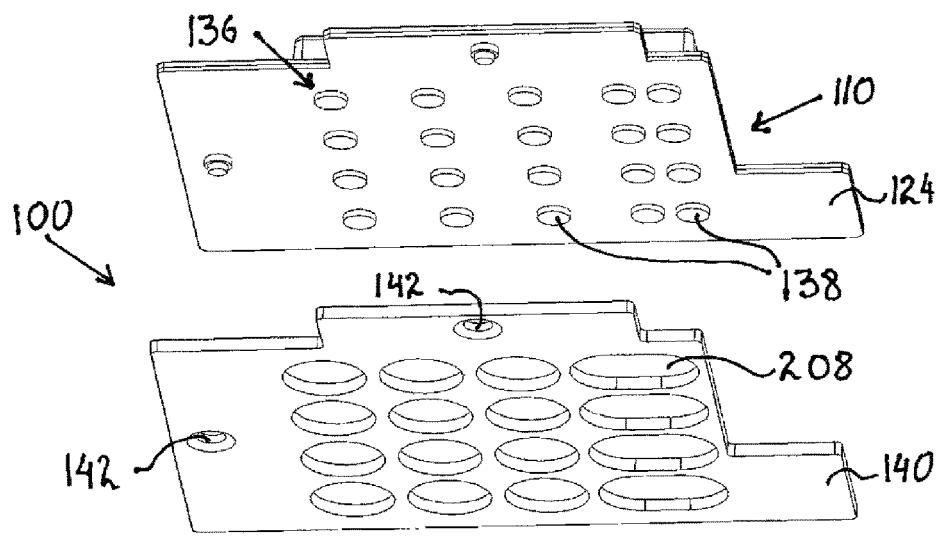
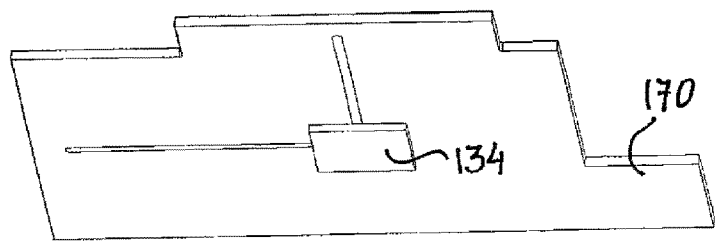
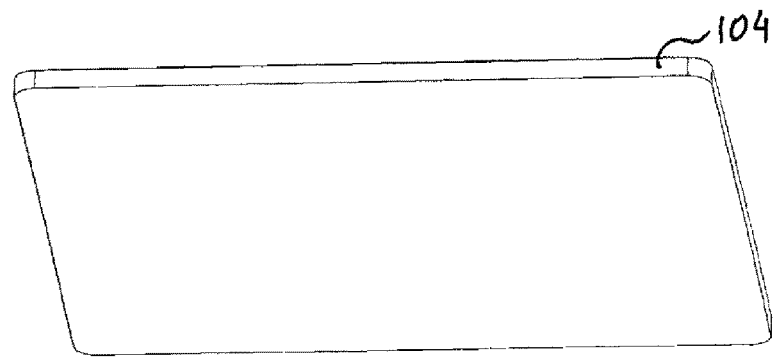
Fig. 1B

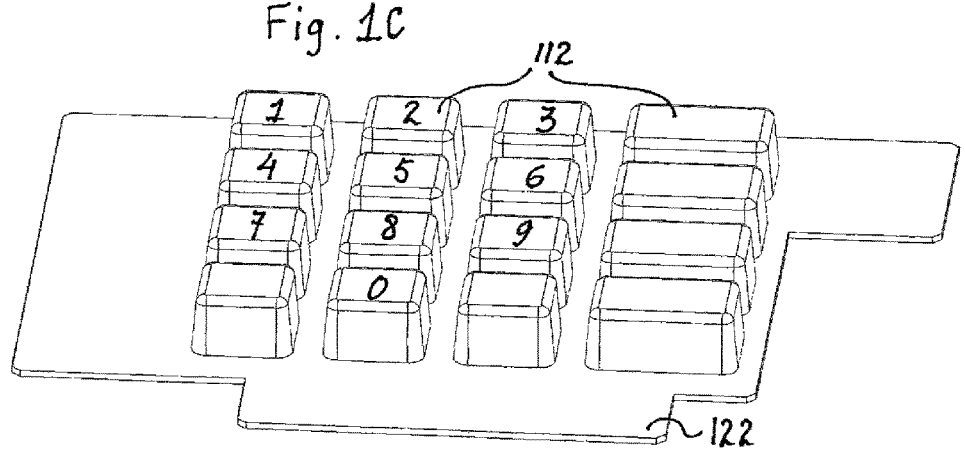
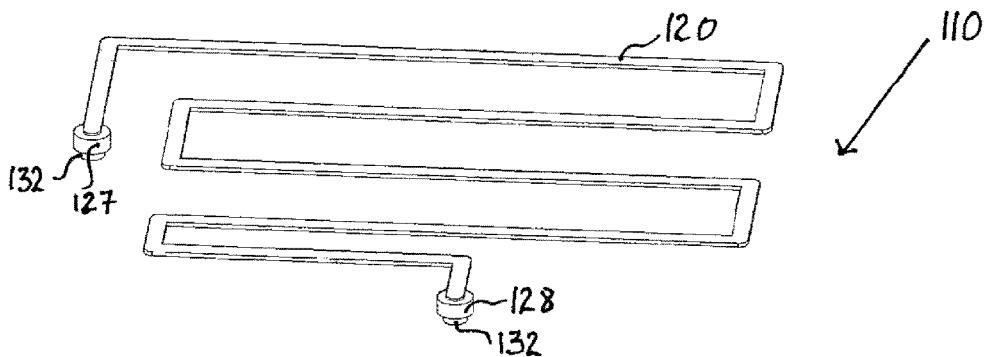
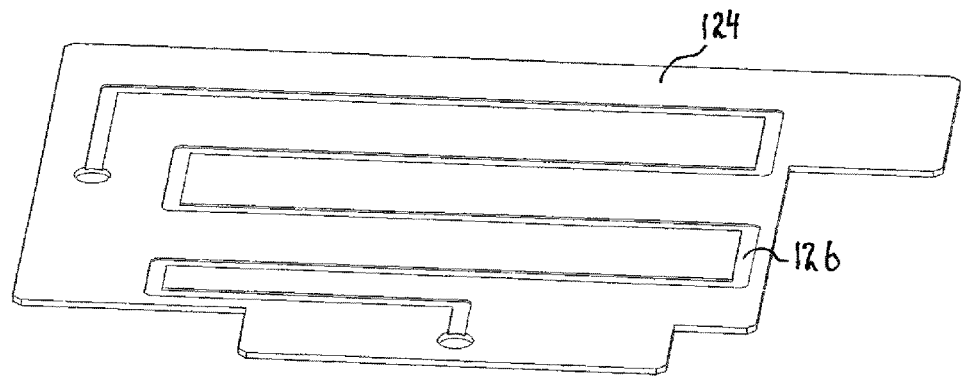
Fig. 1C

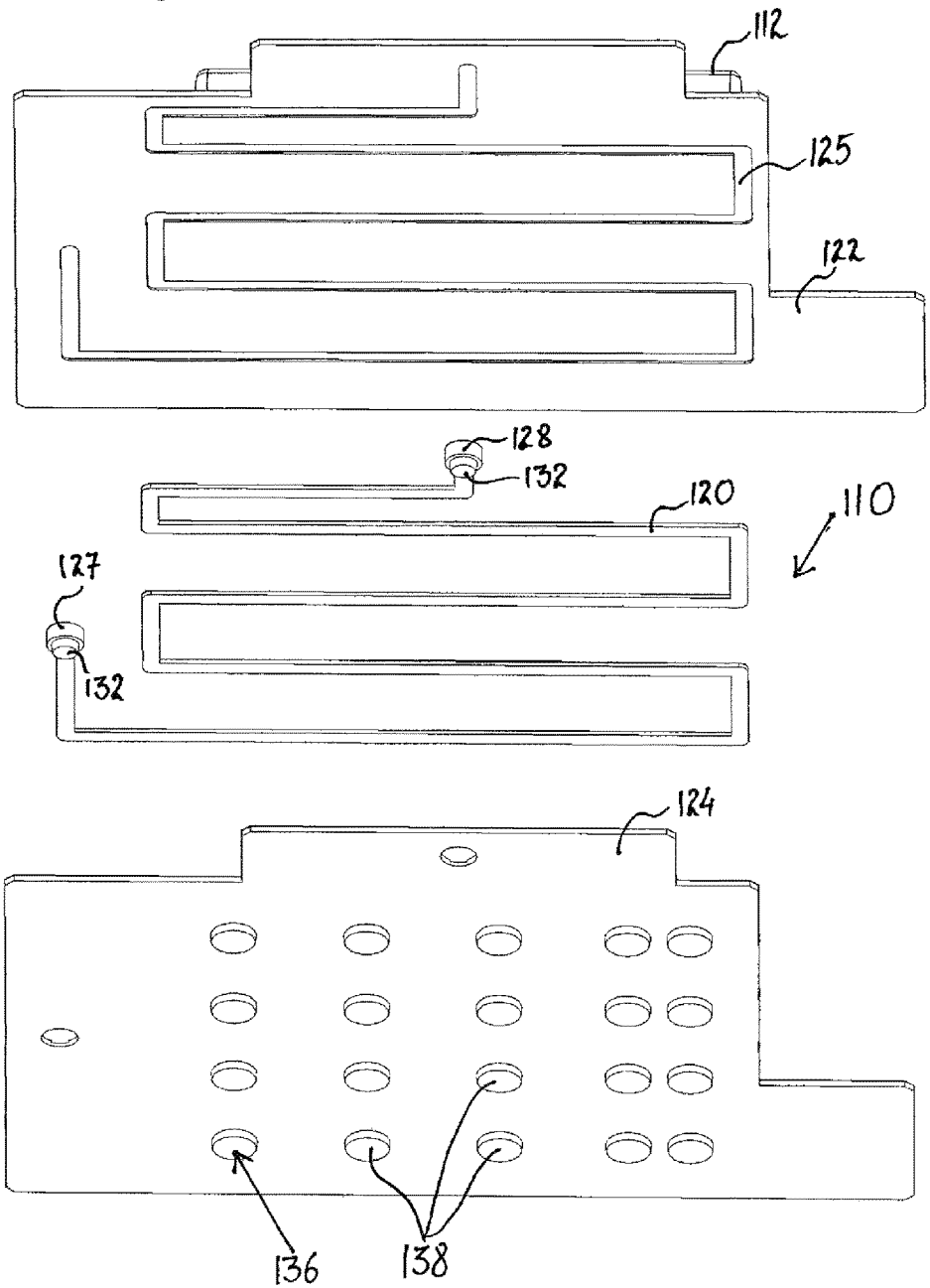

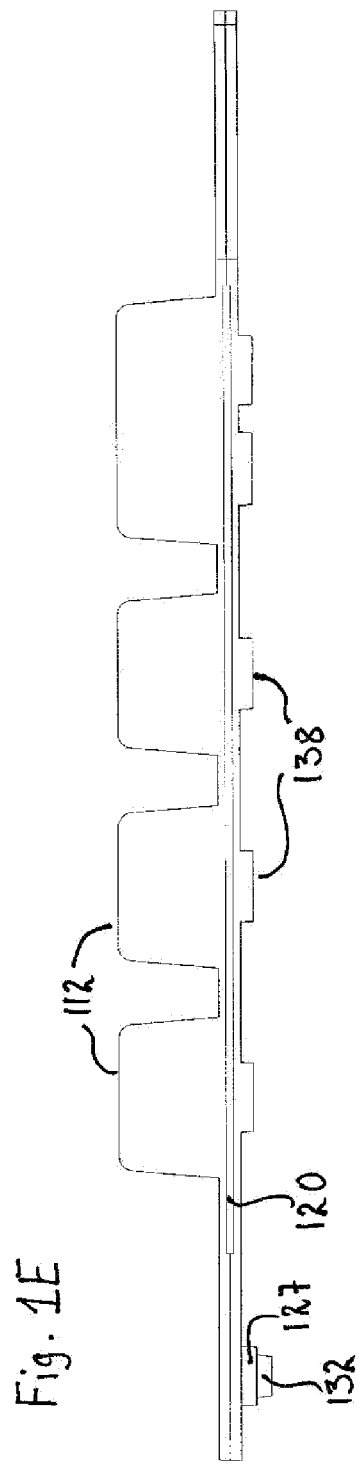

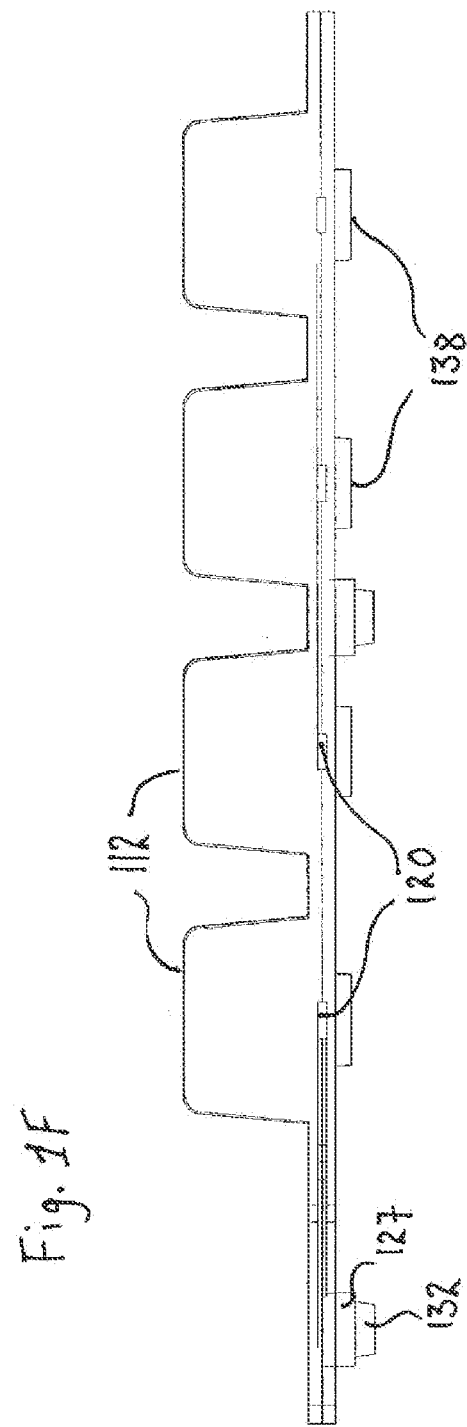

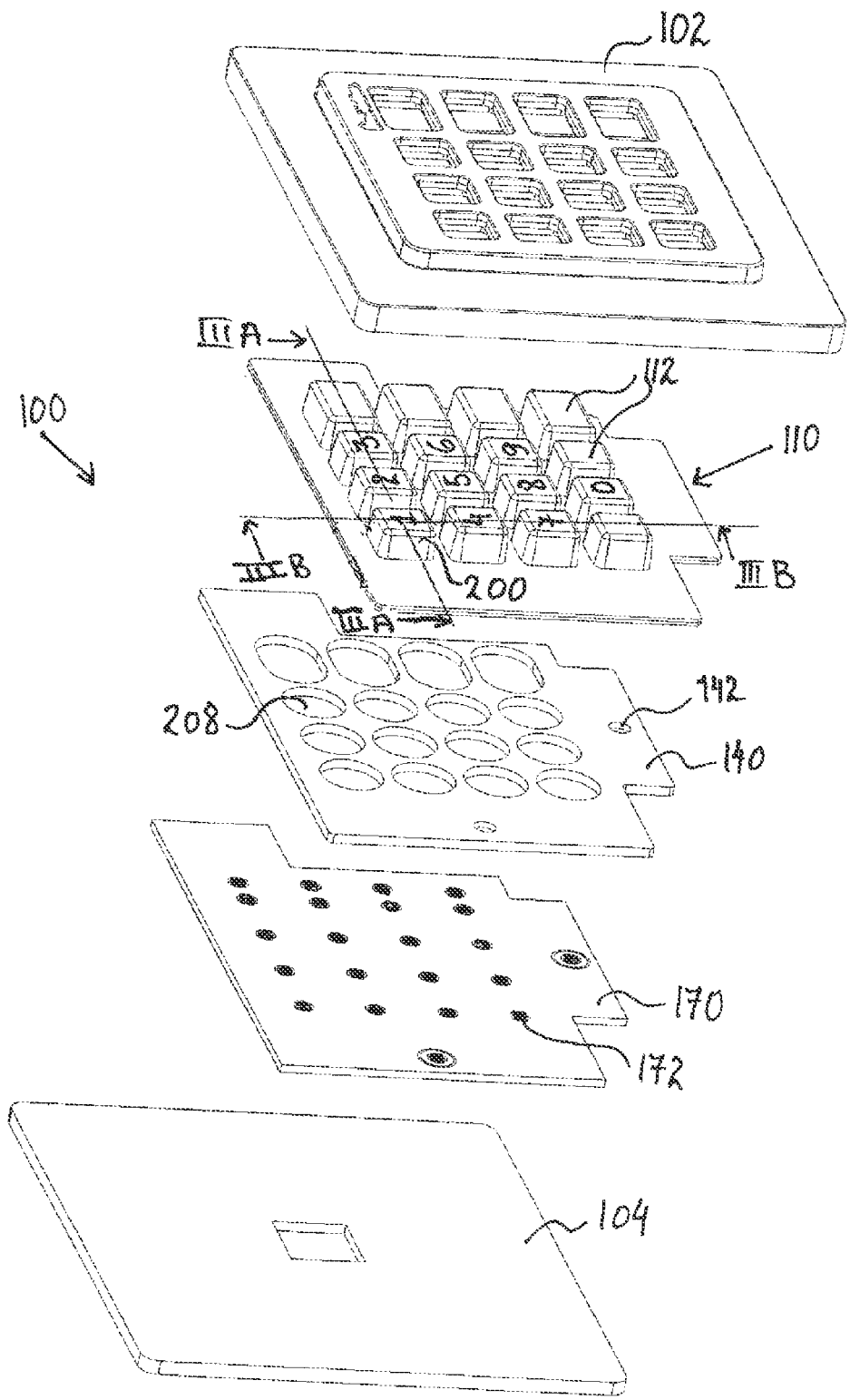

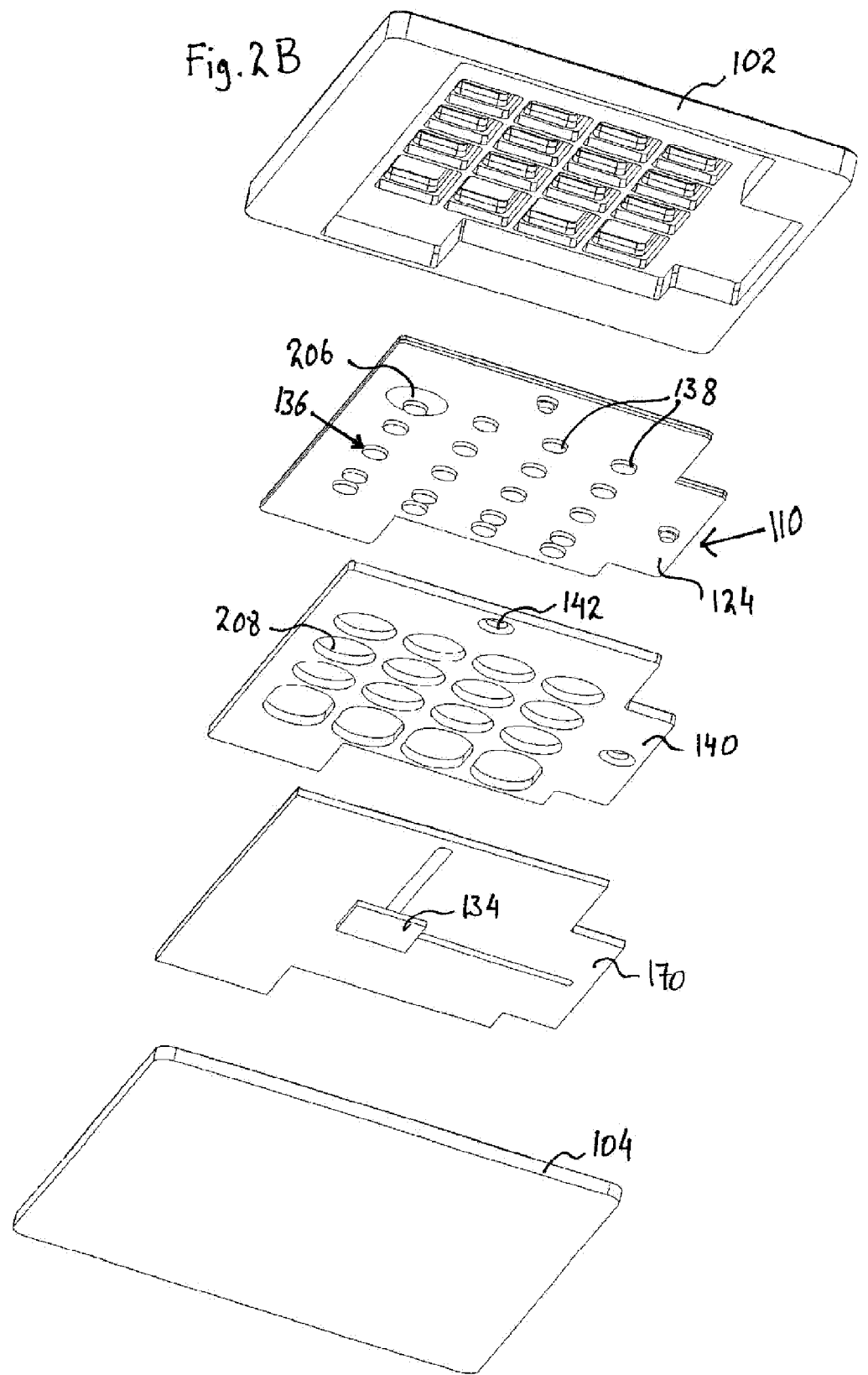

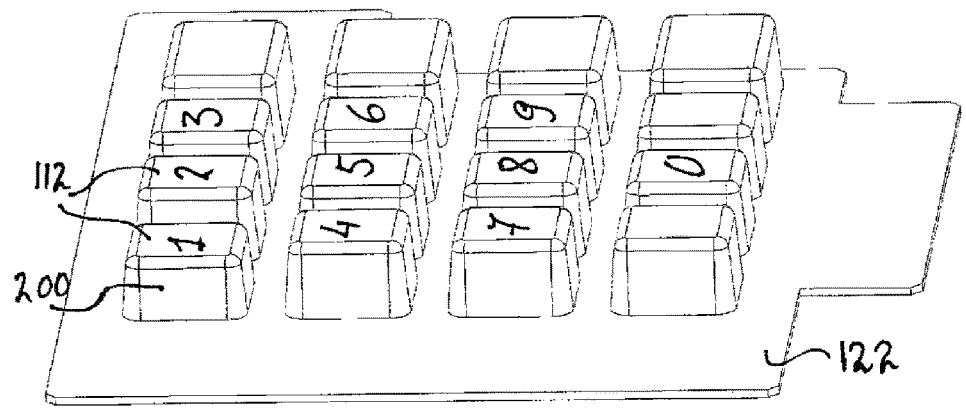
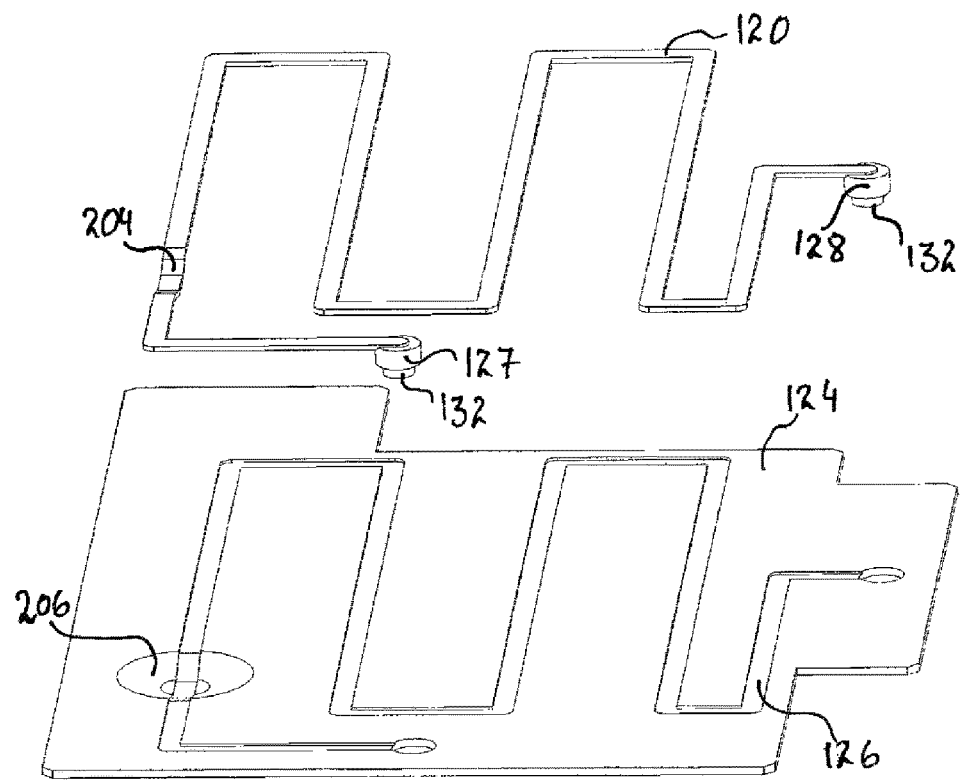
Fig. 2C

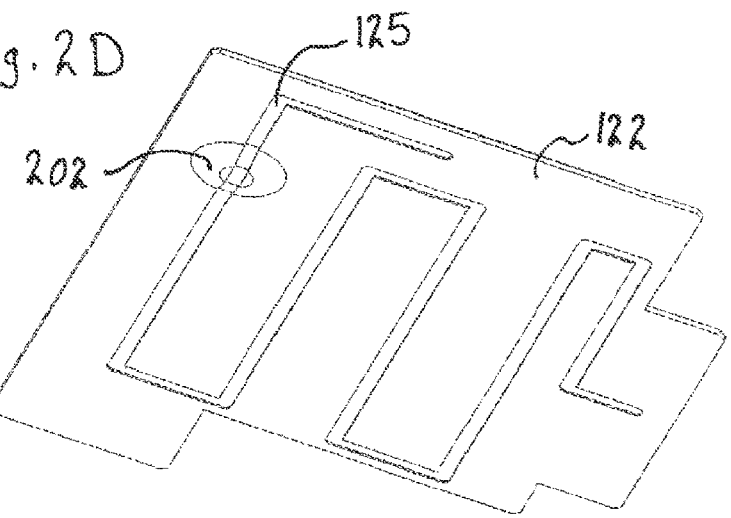
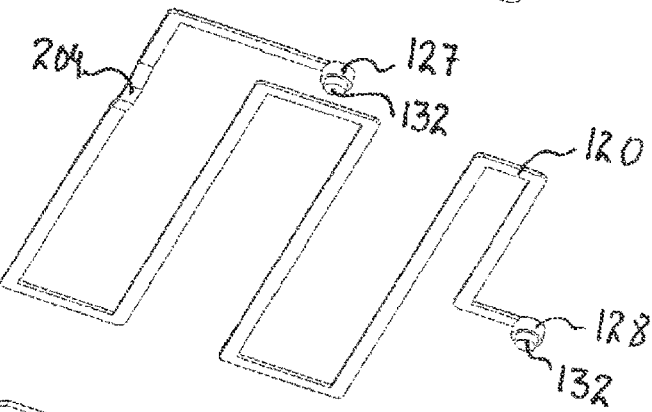
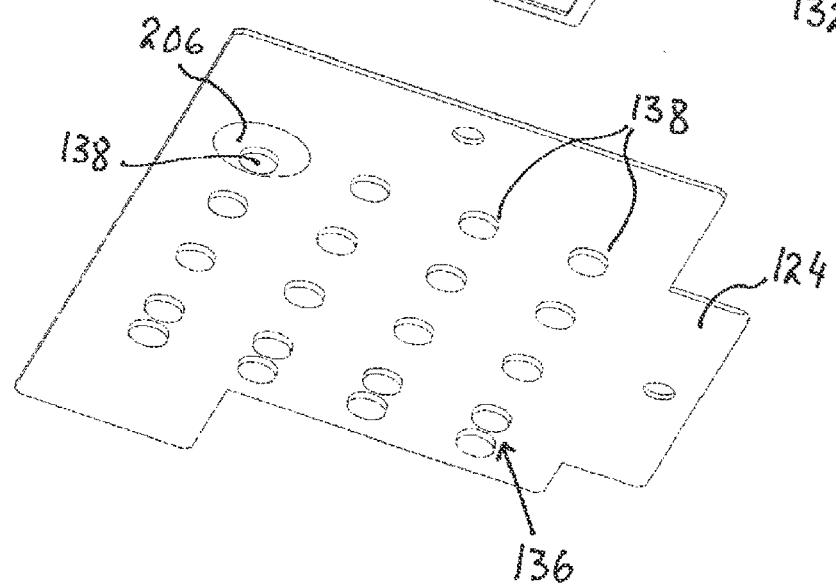
Fig. 2D

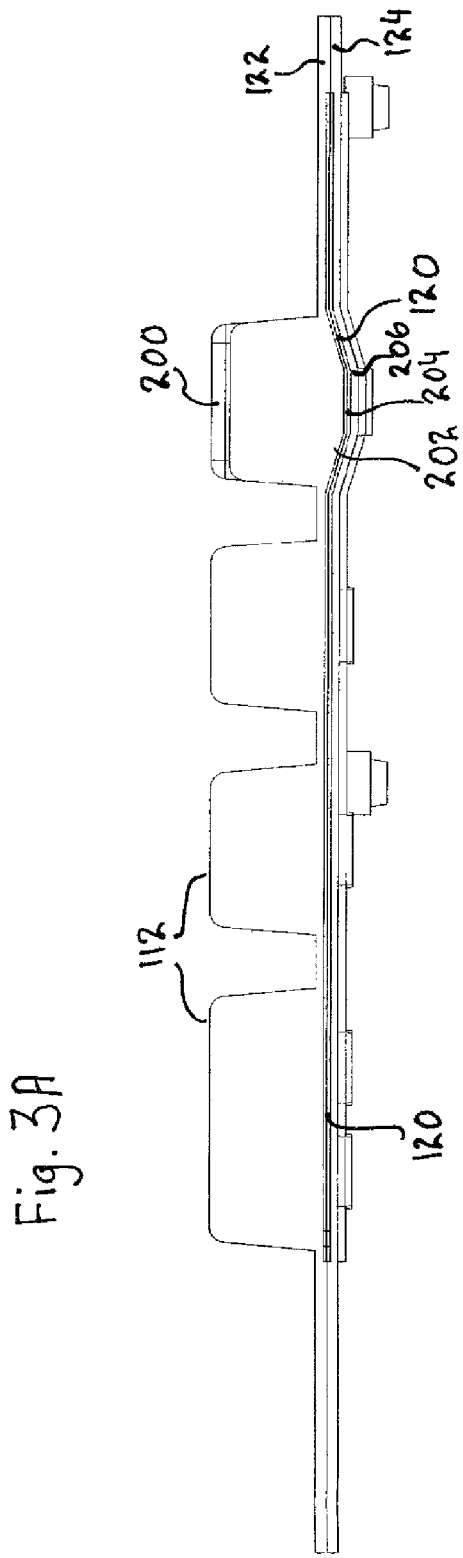

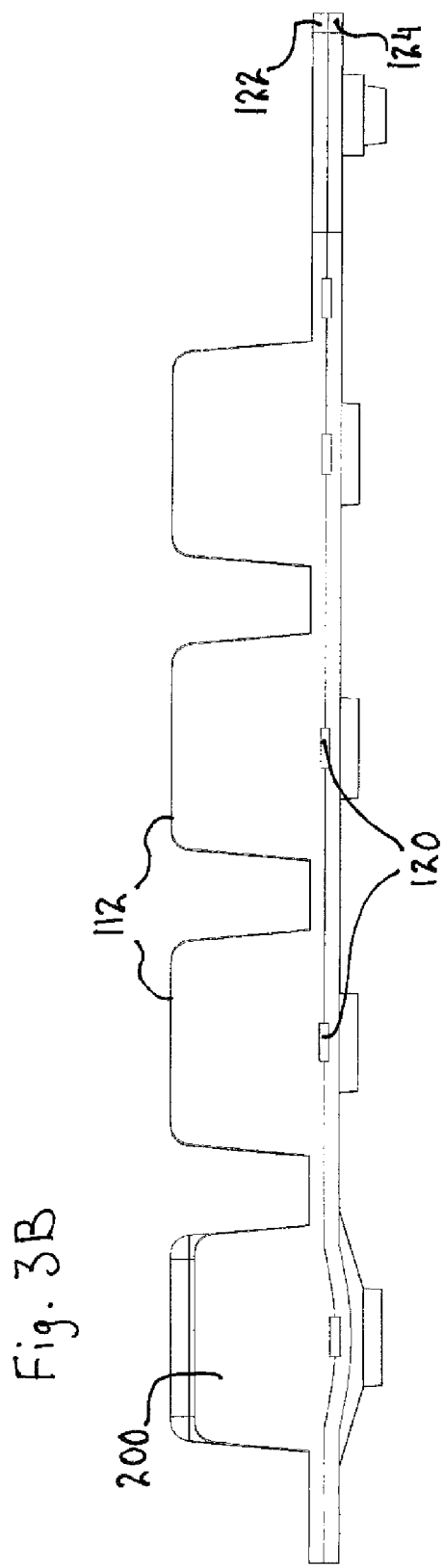

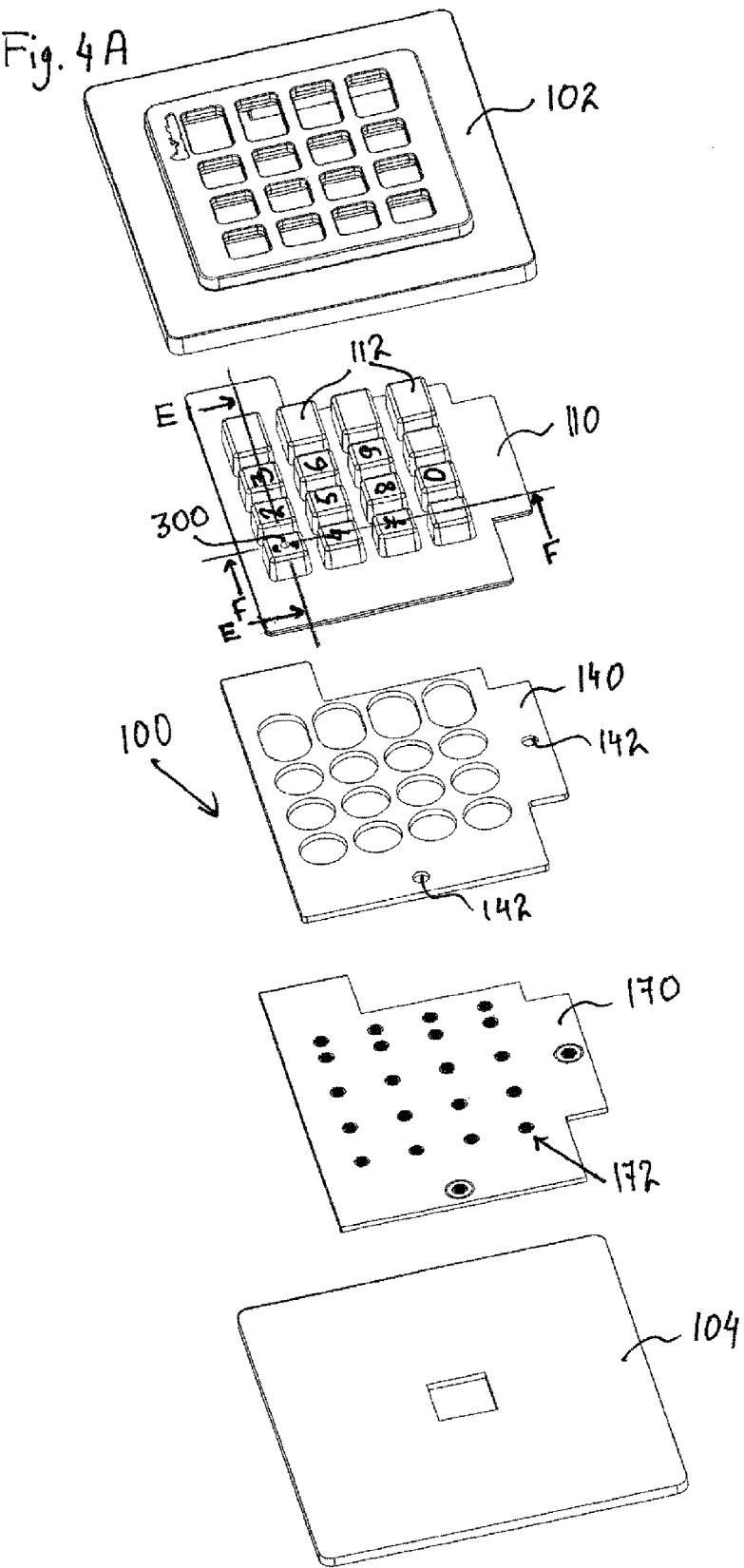

Fig. 4B
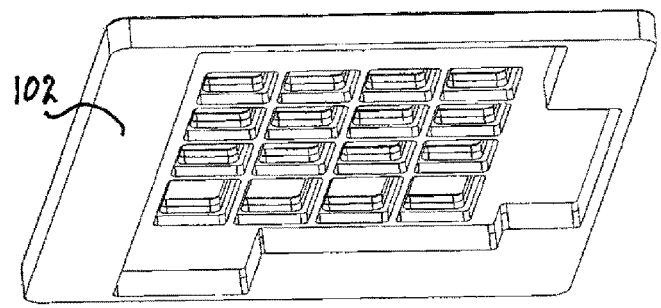
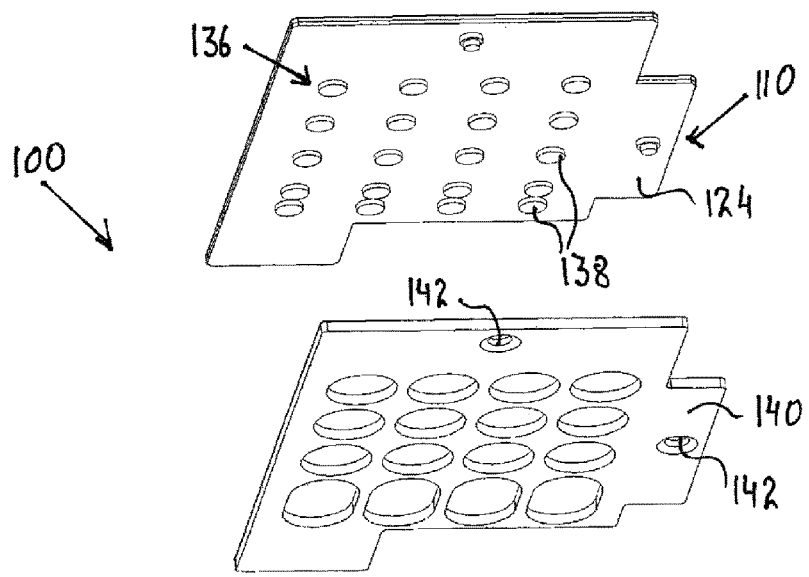
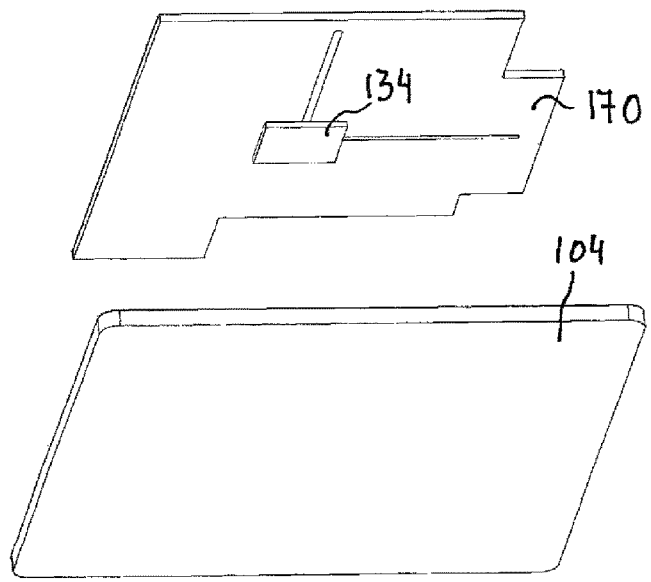

Fig. 4C
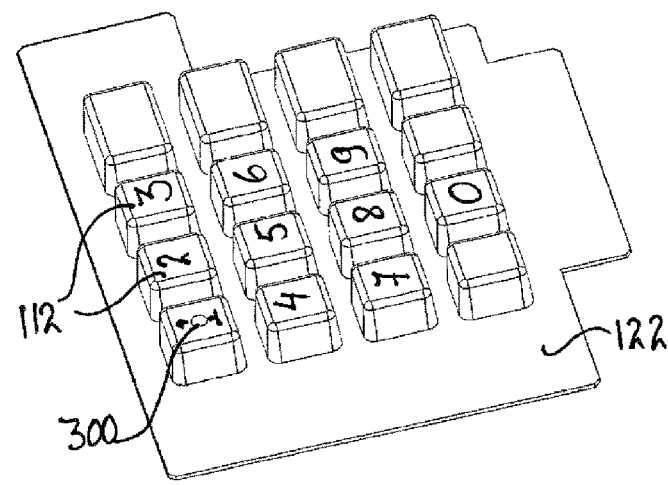
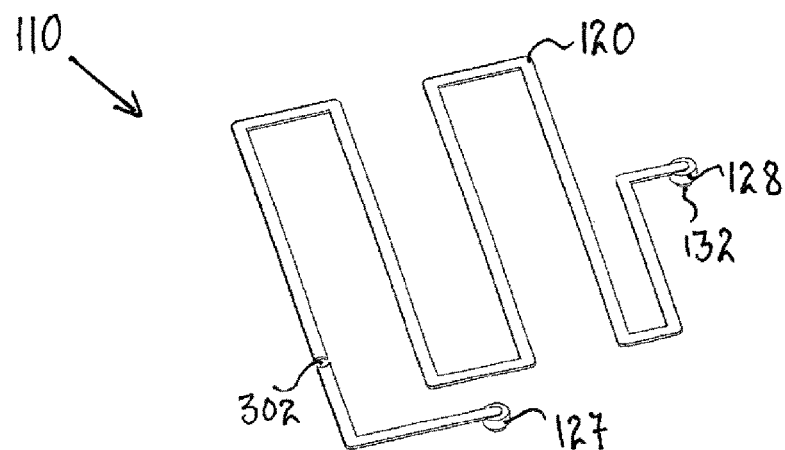
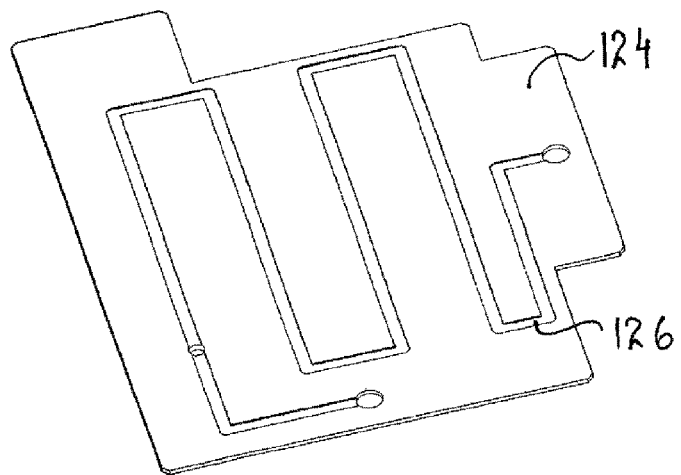

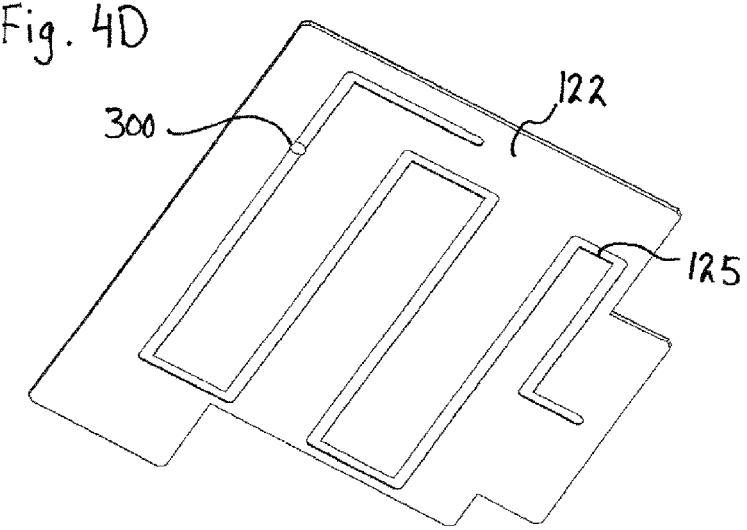
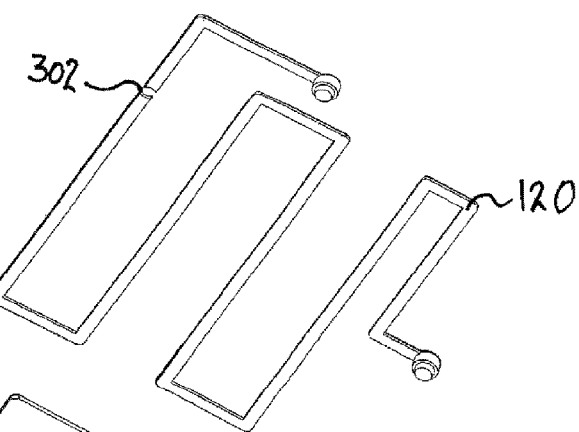
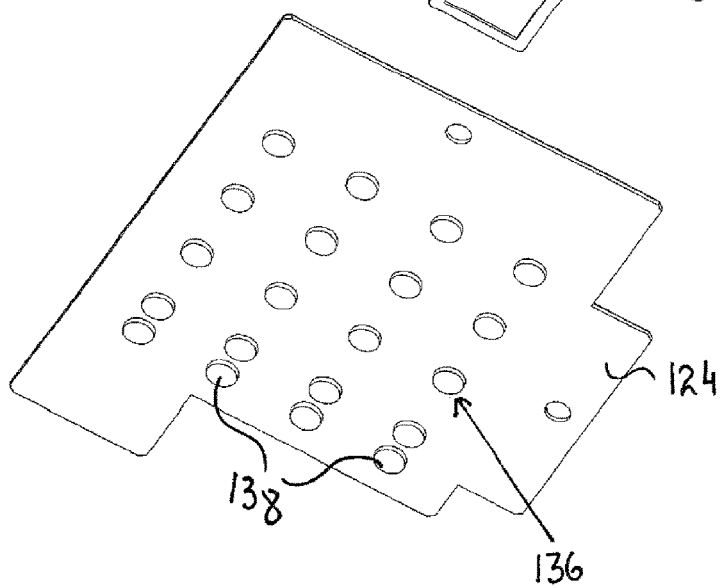
Fig. 4D

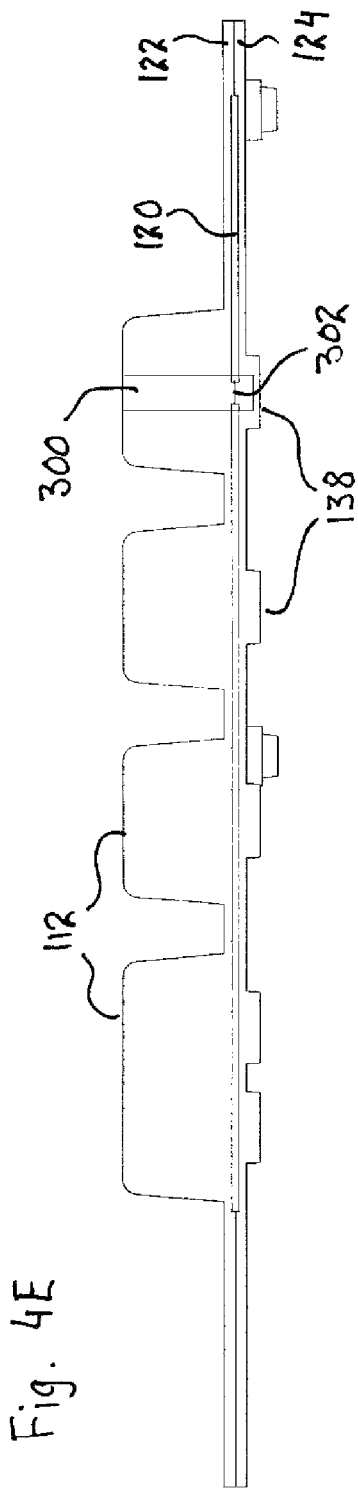

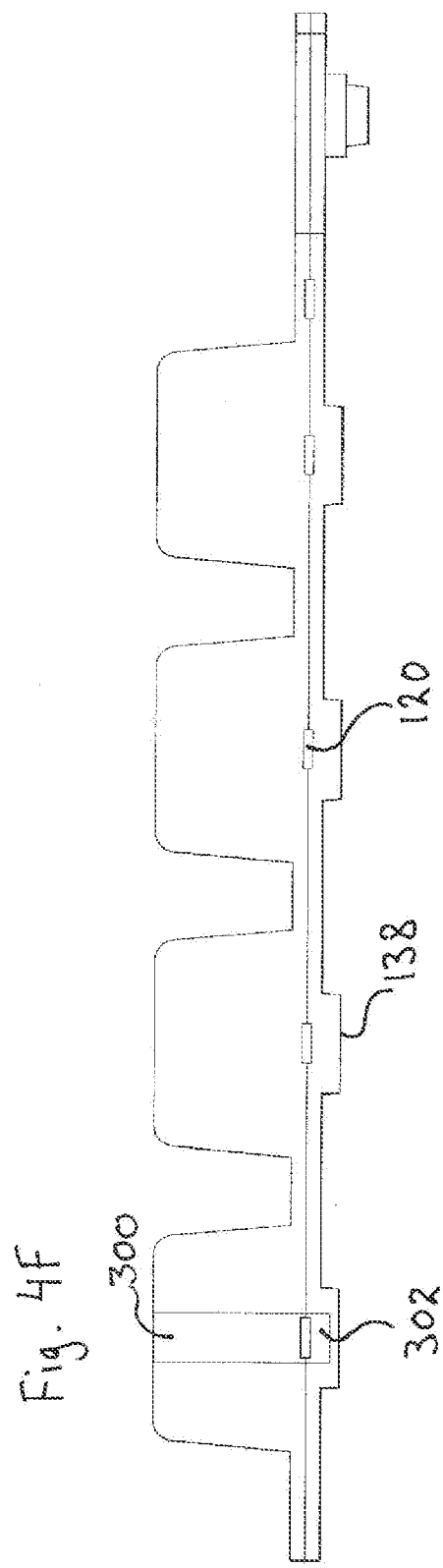

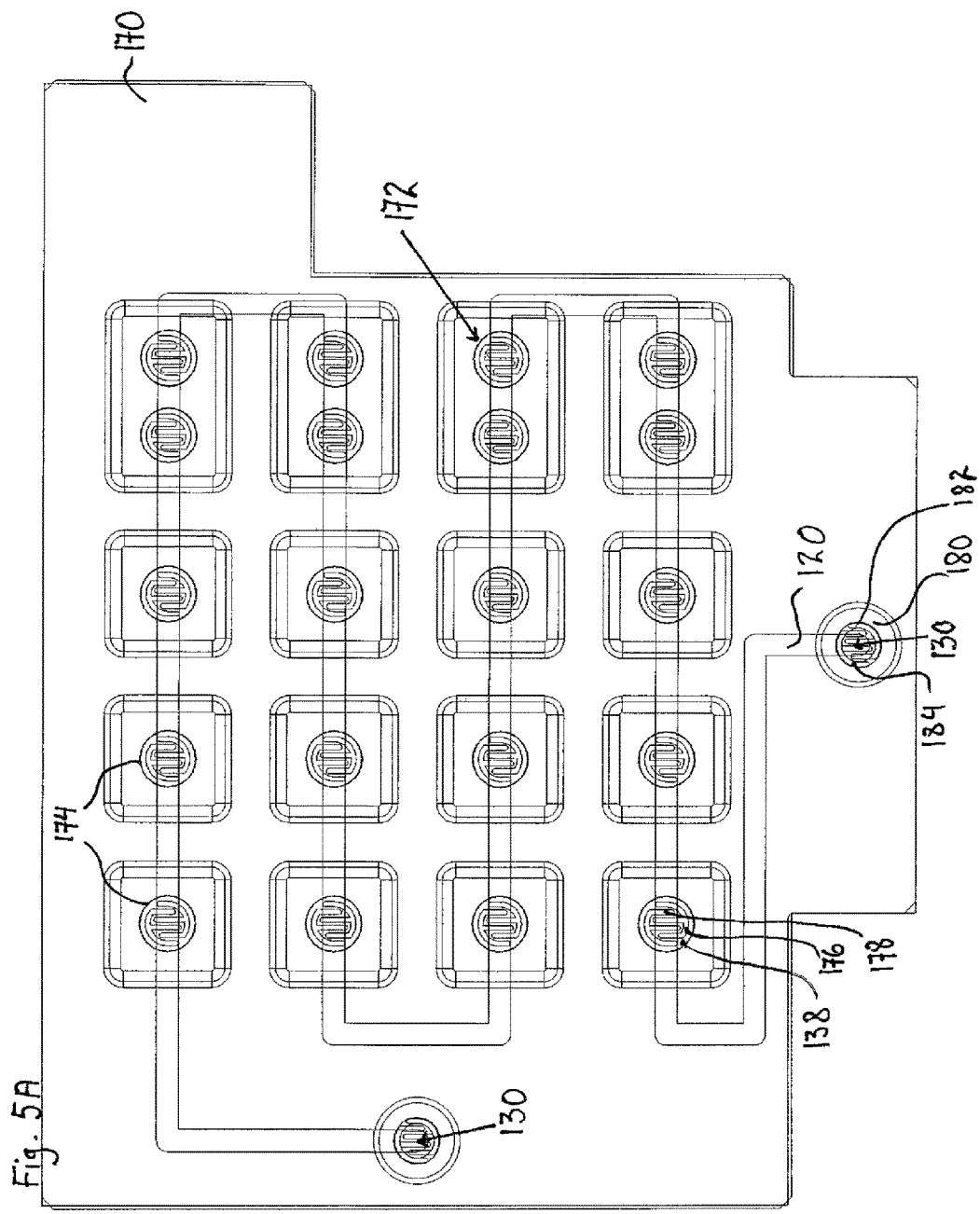

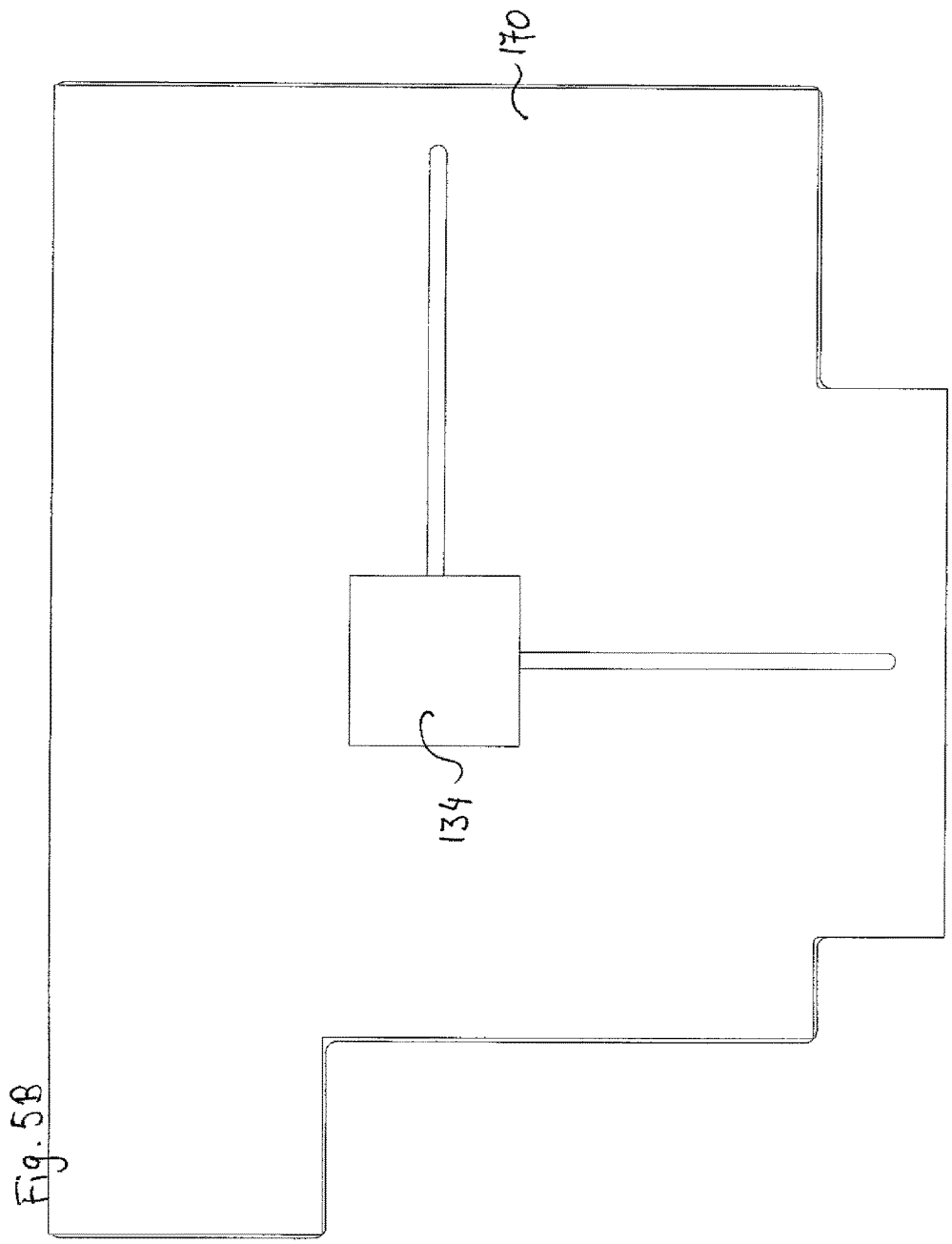

Fig. 6A
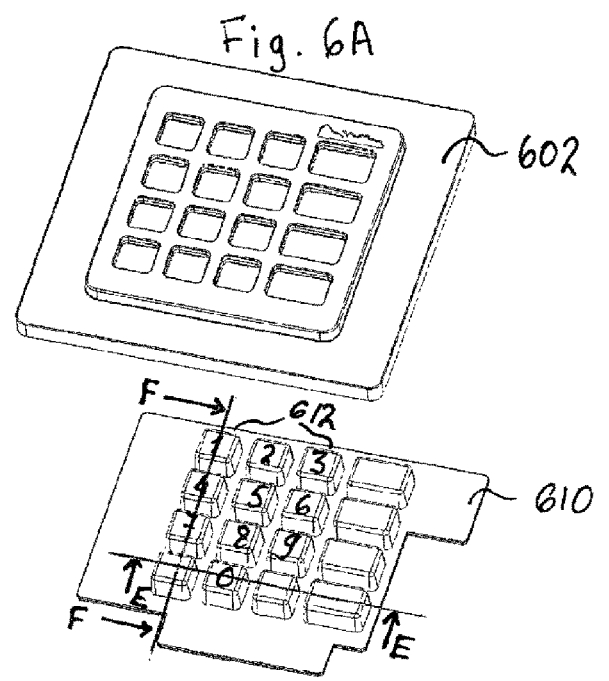
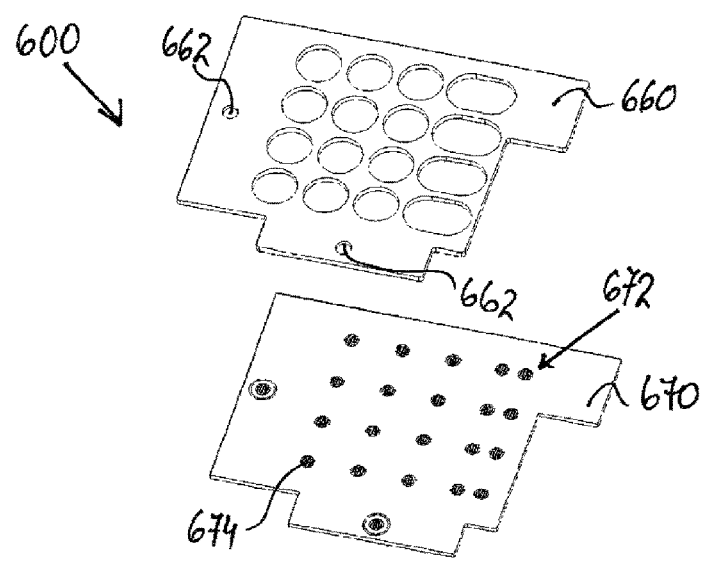
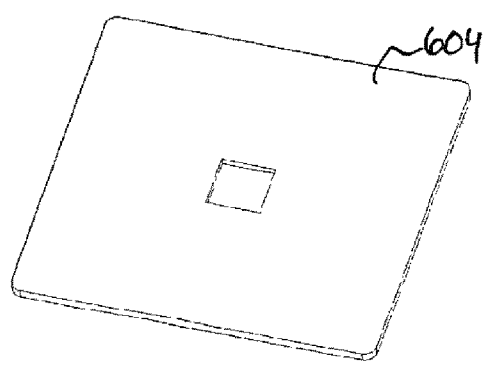

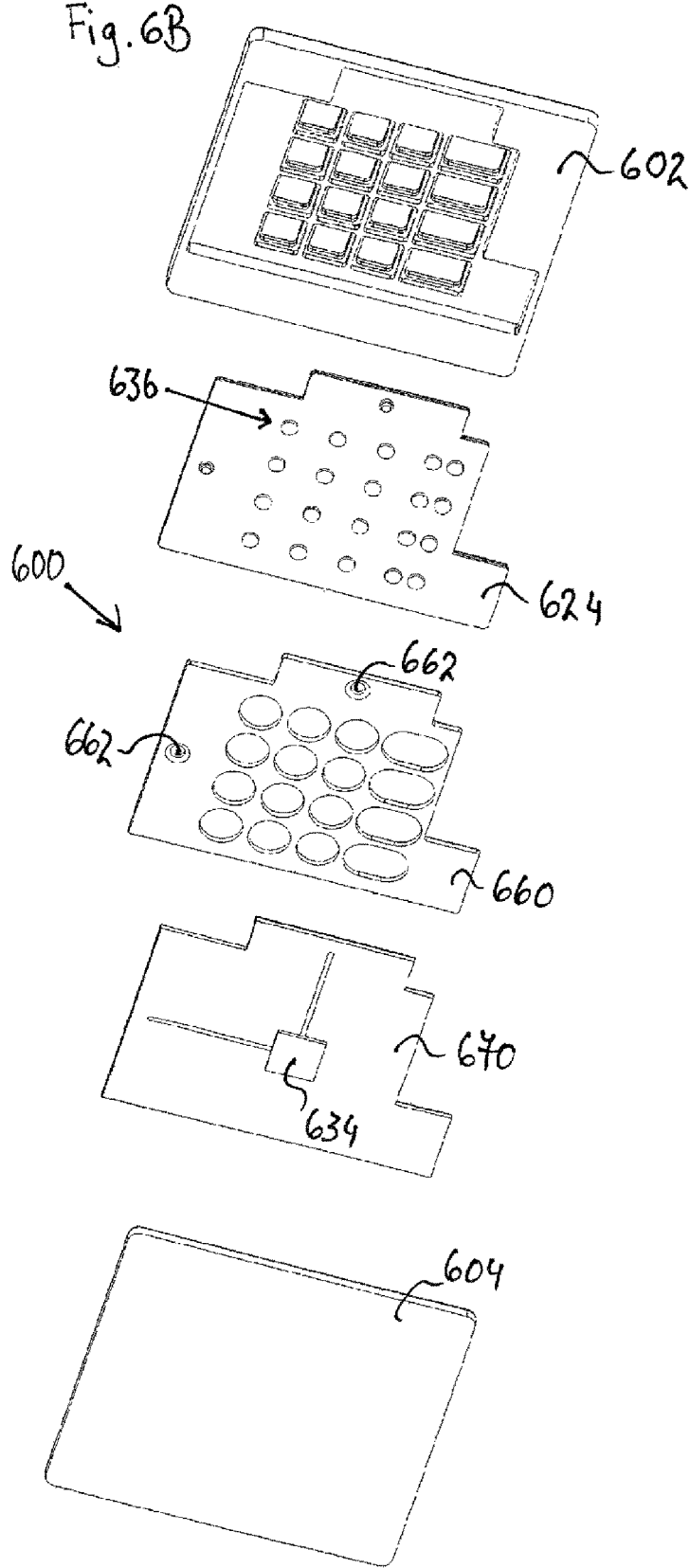

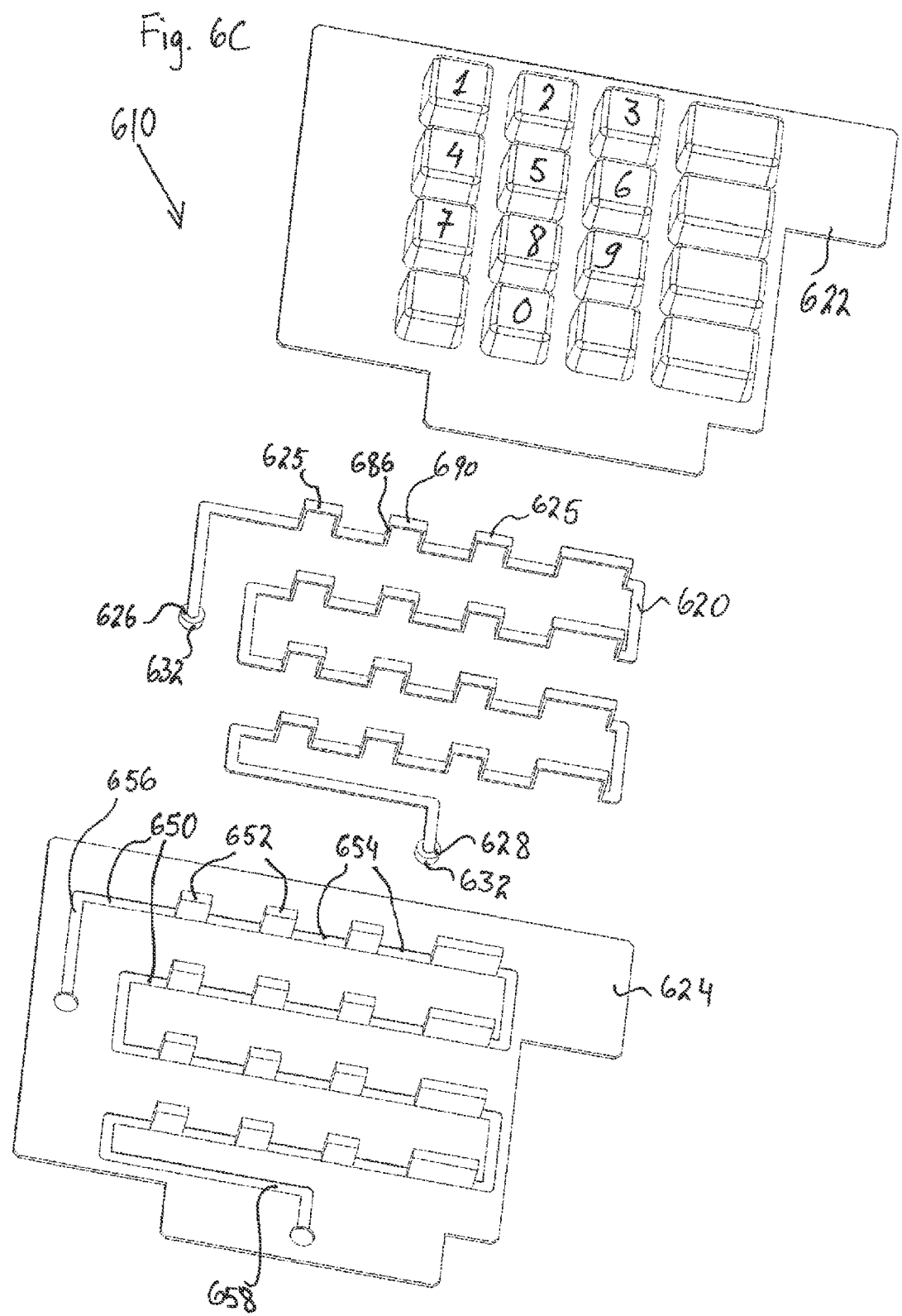

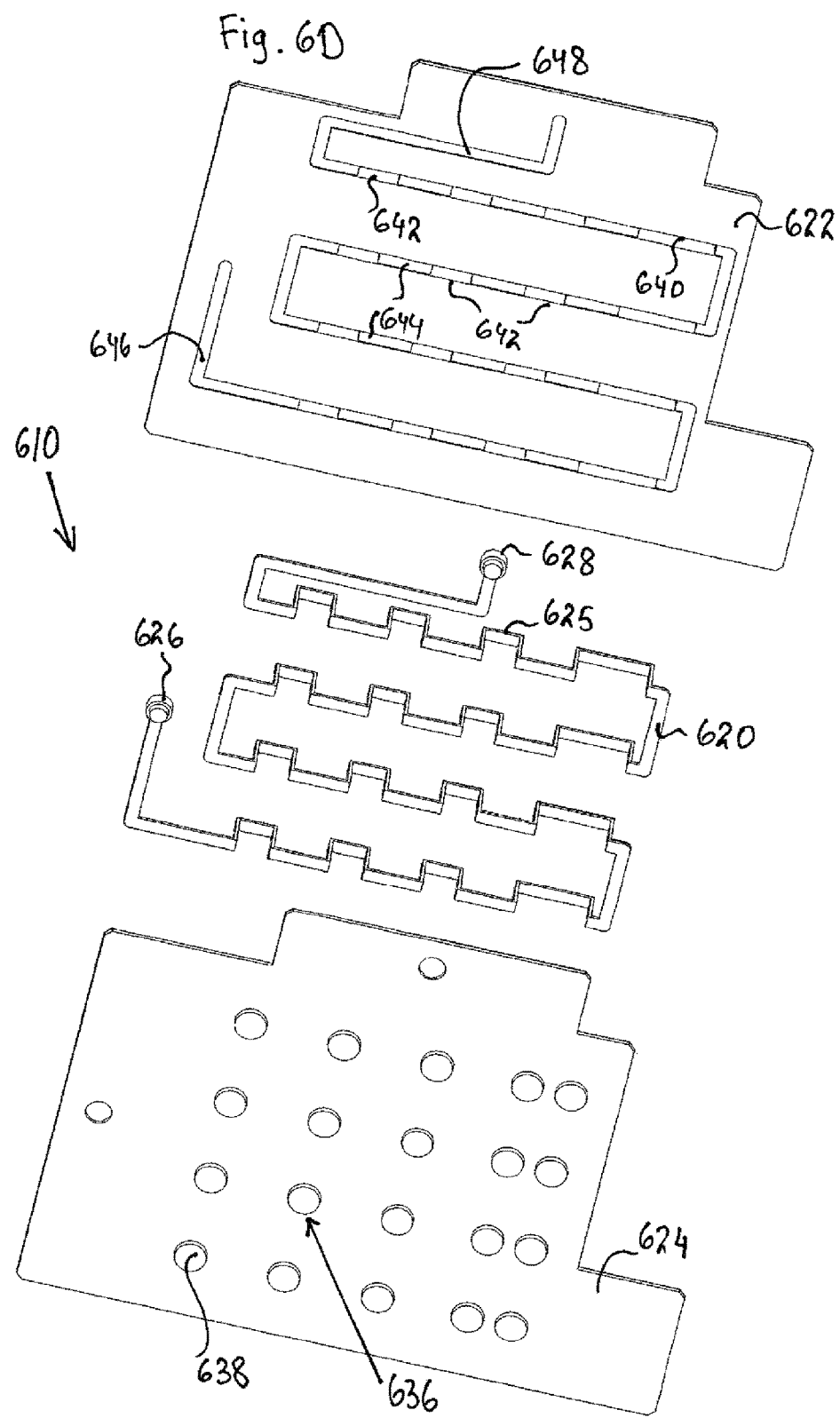

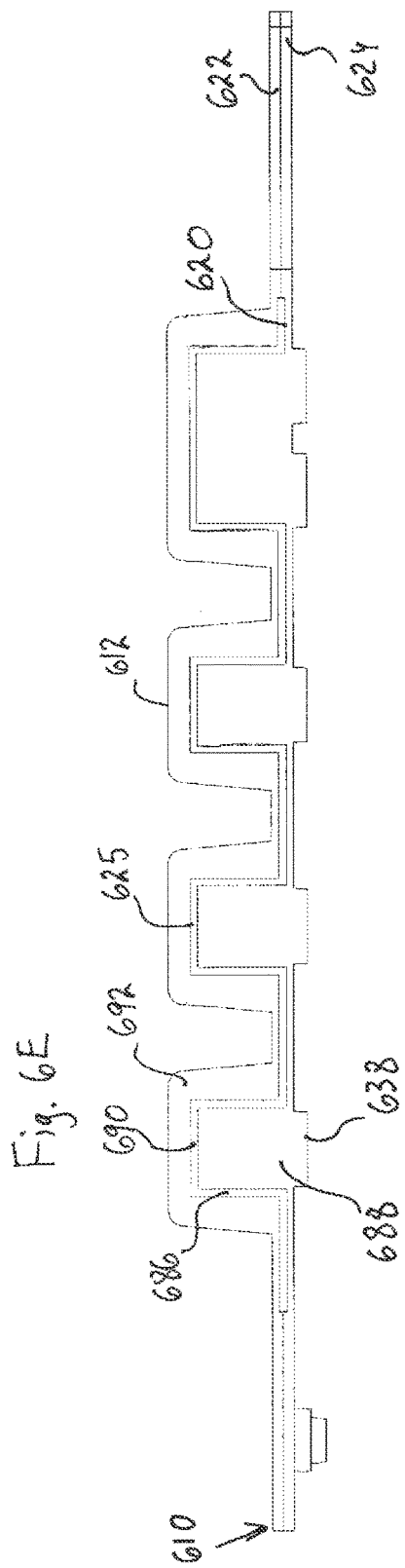

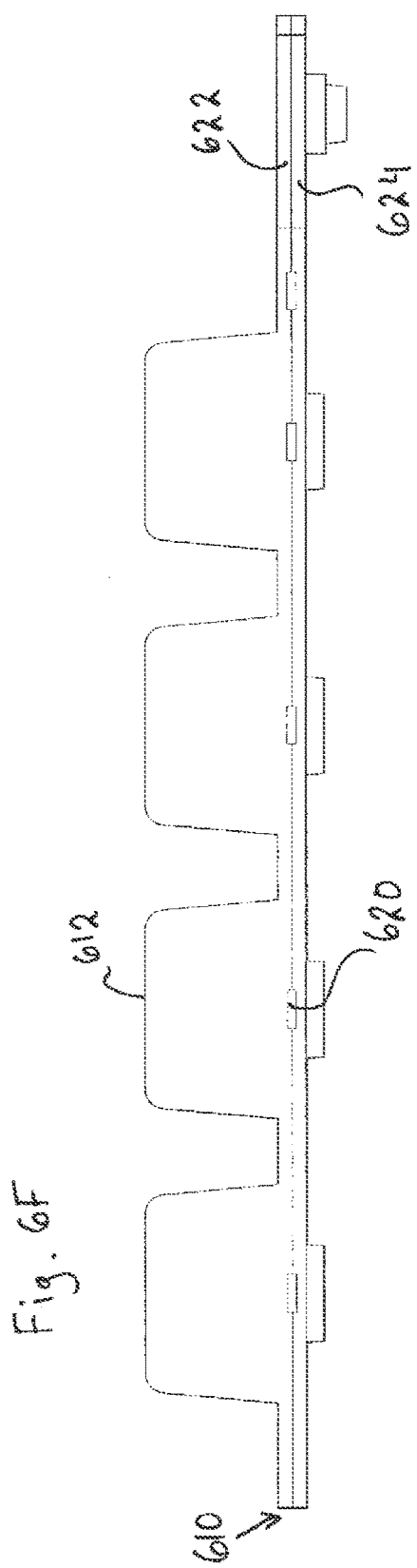

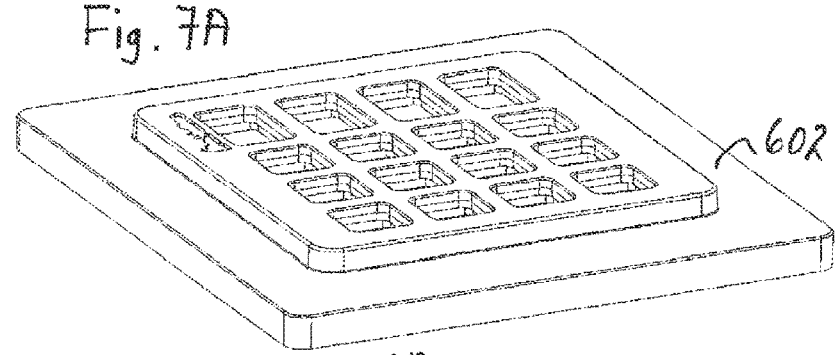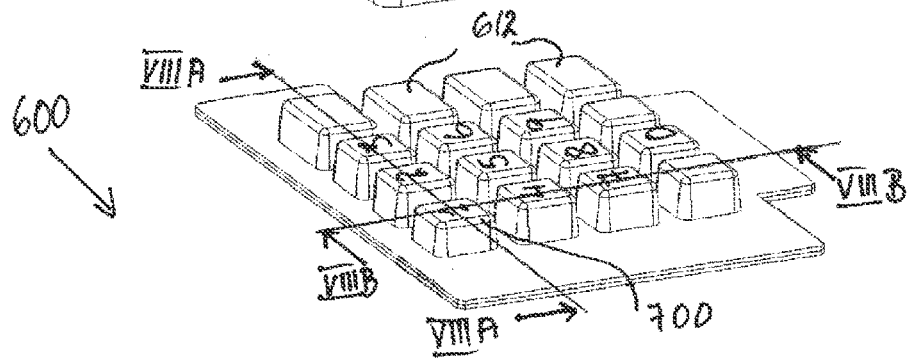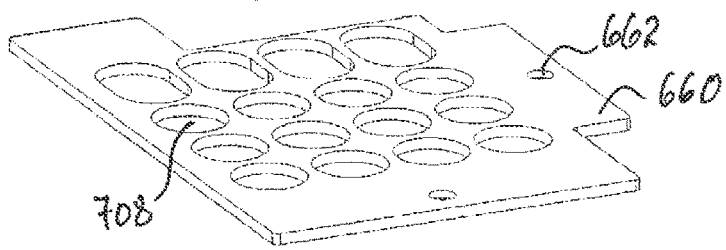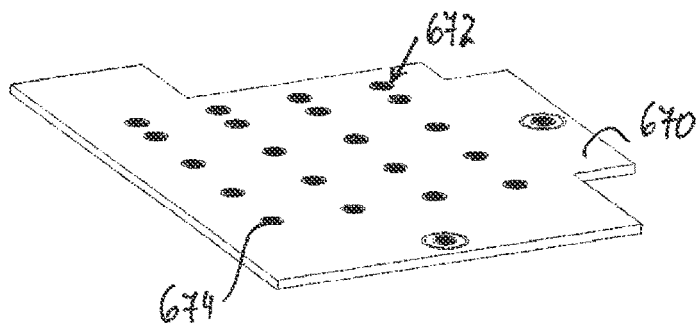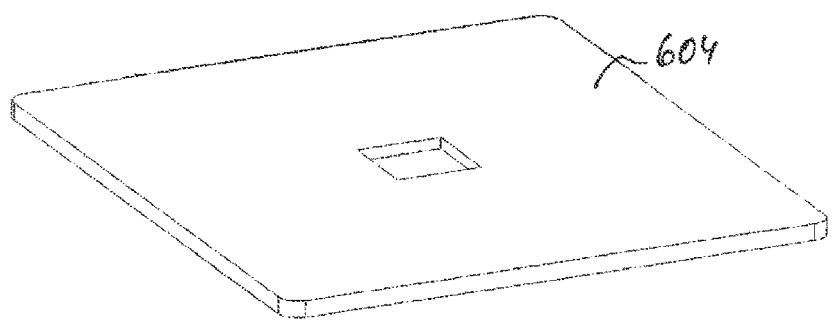

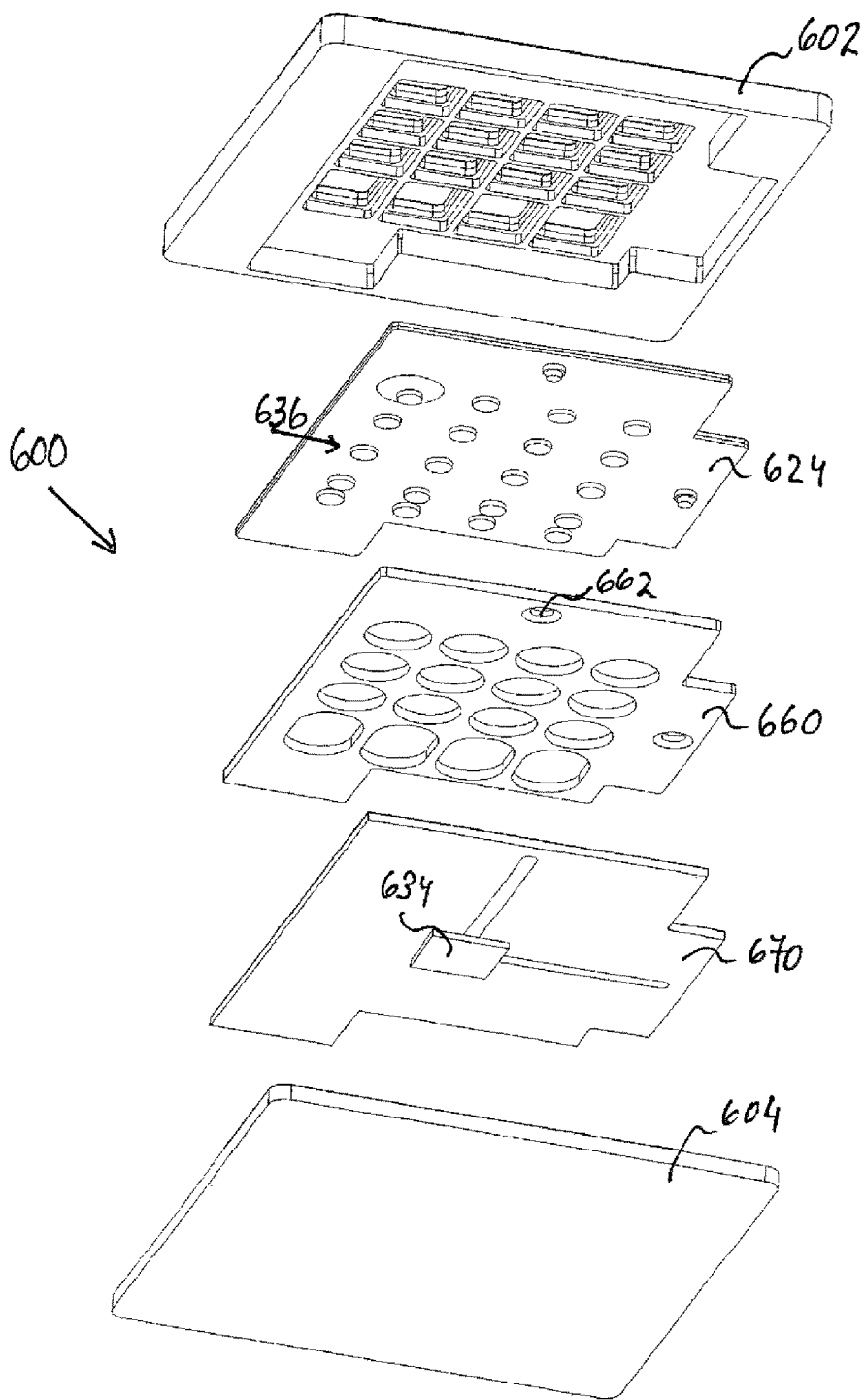

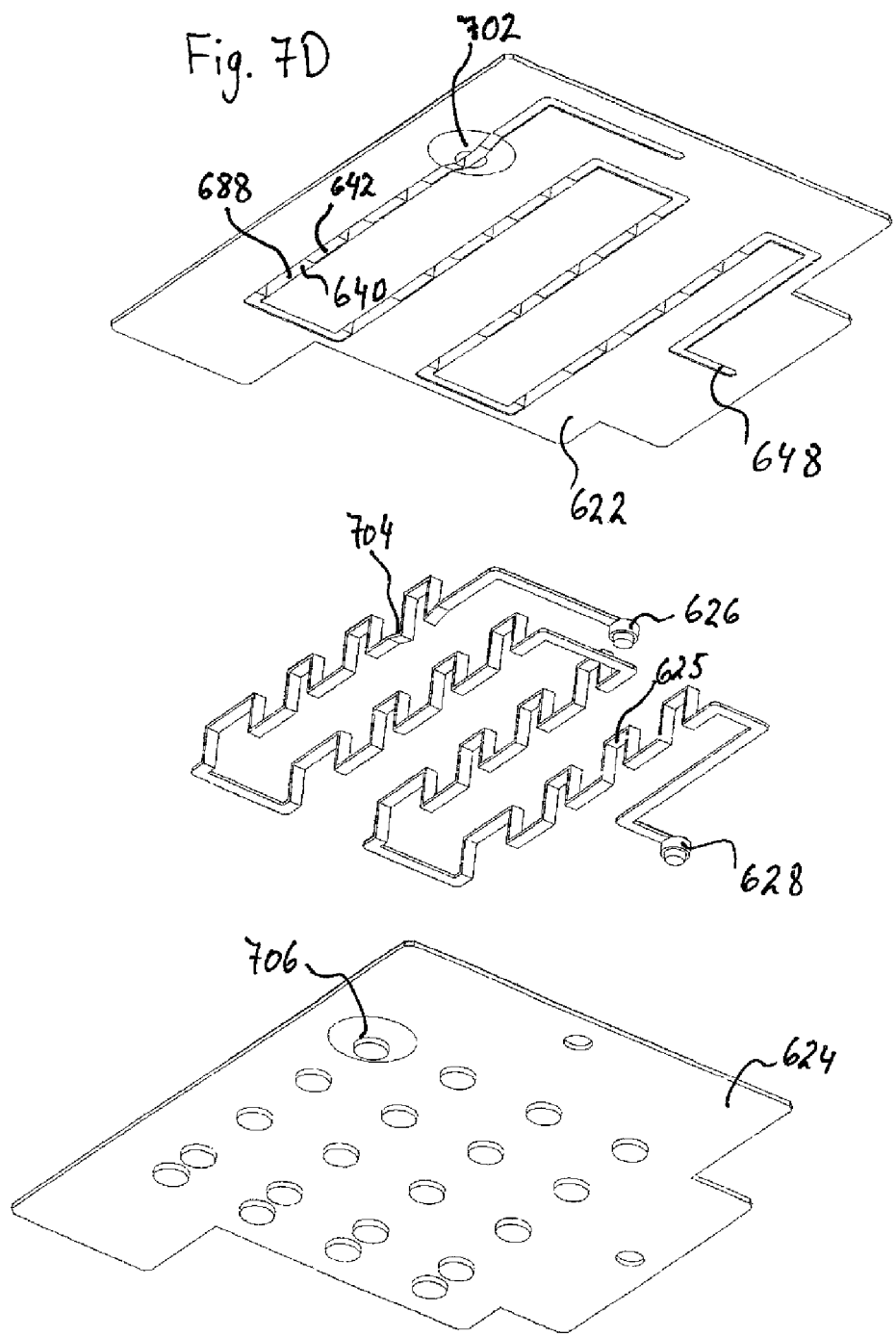

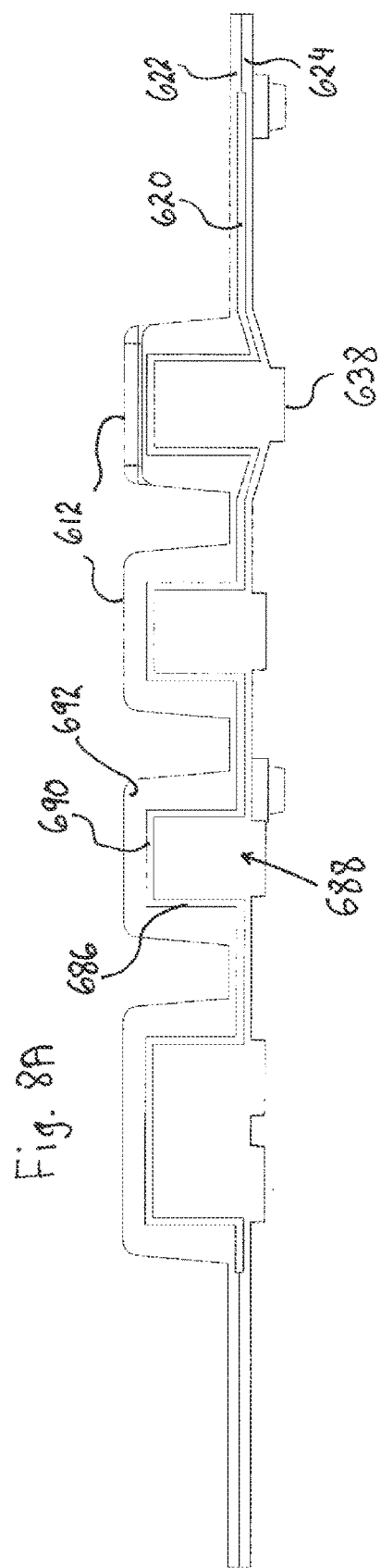

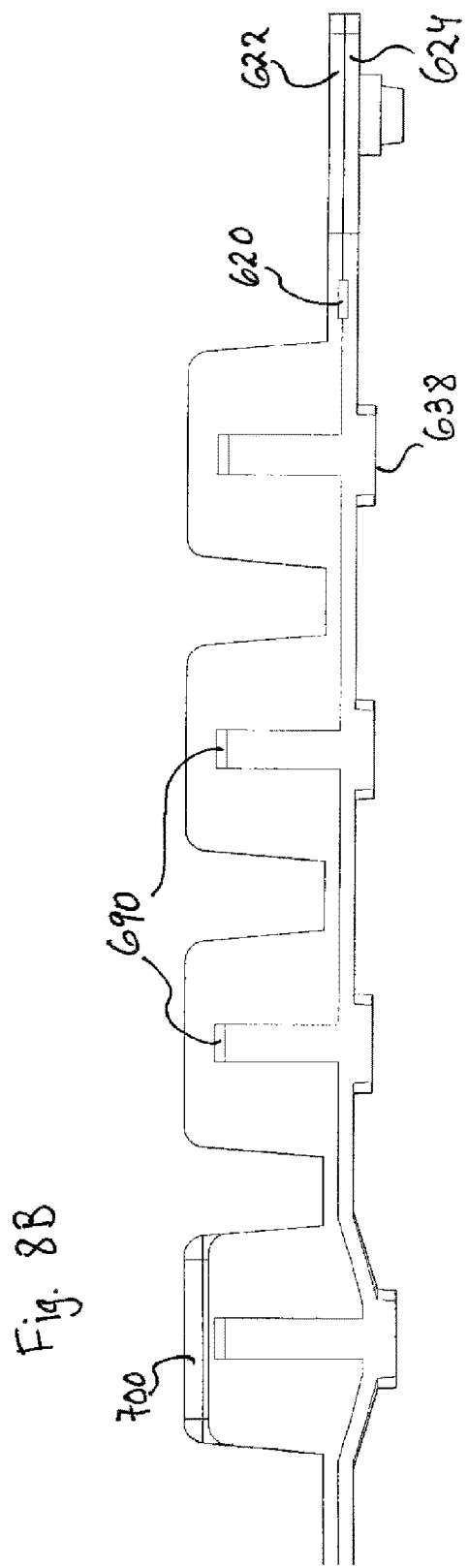

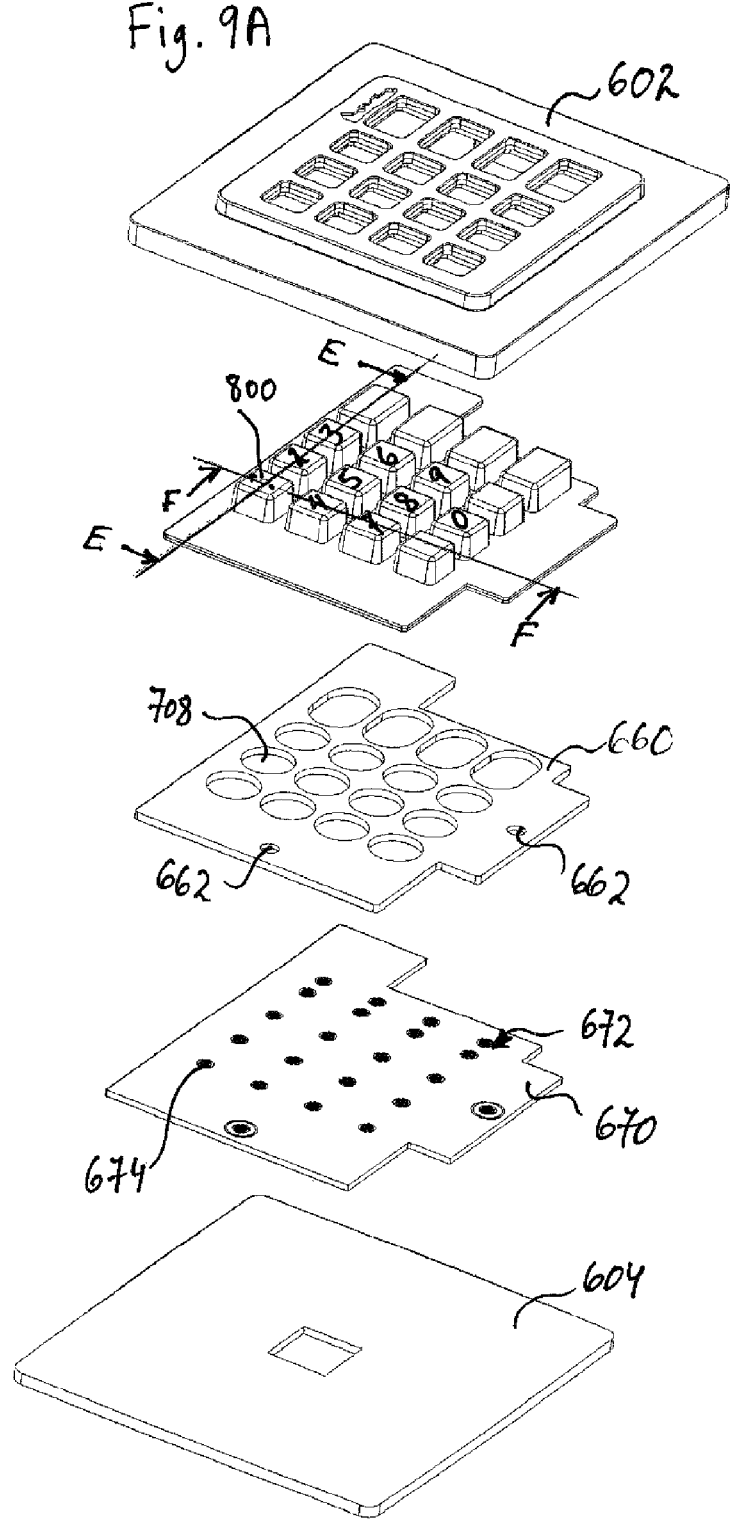

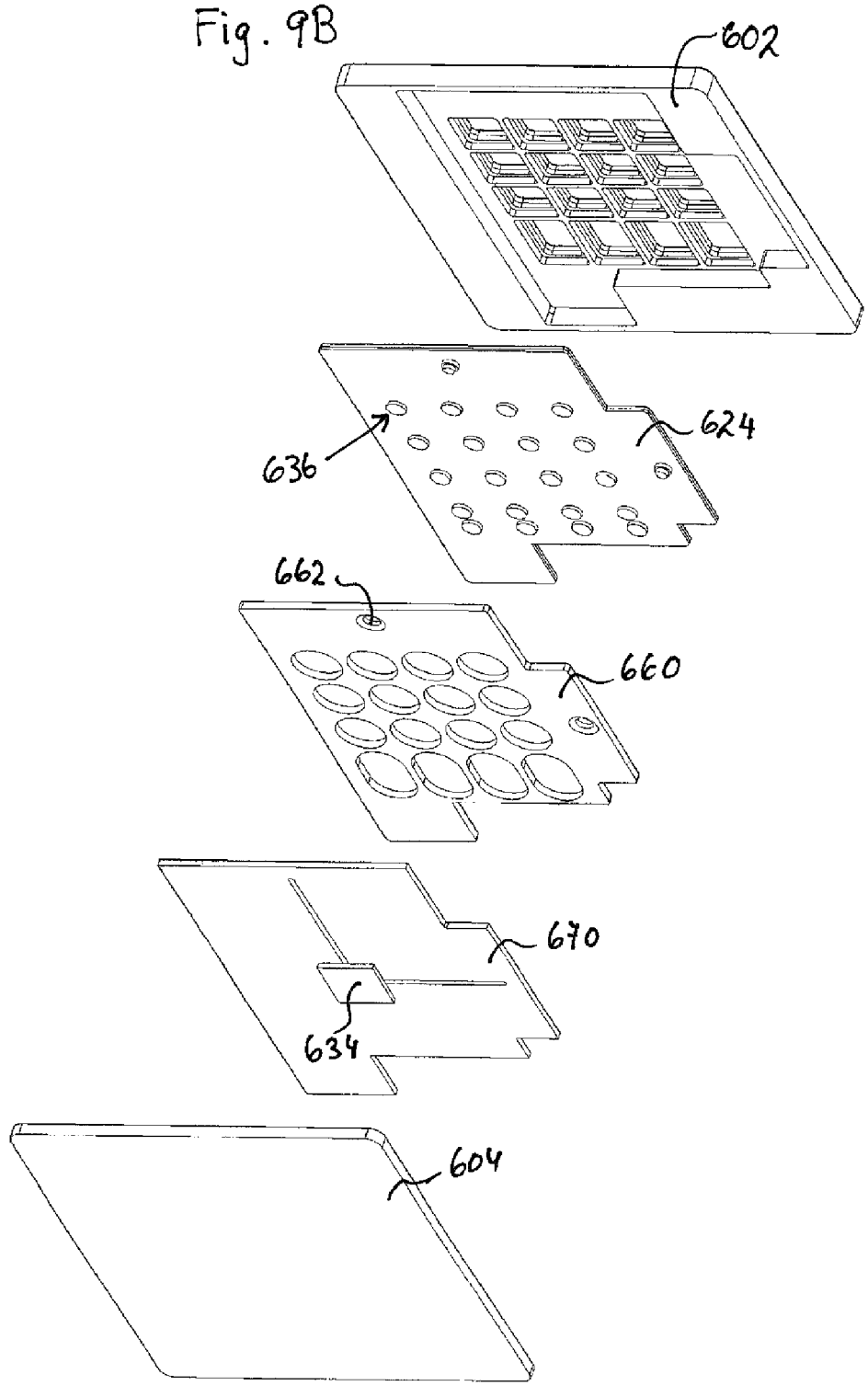

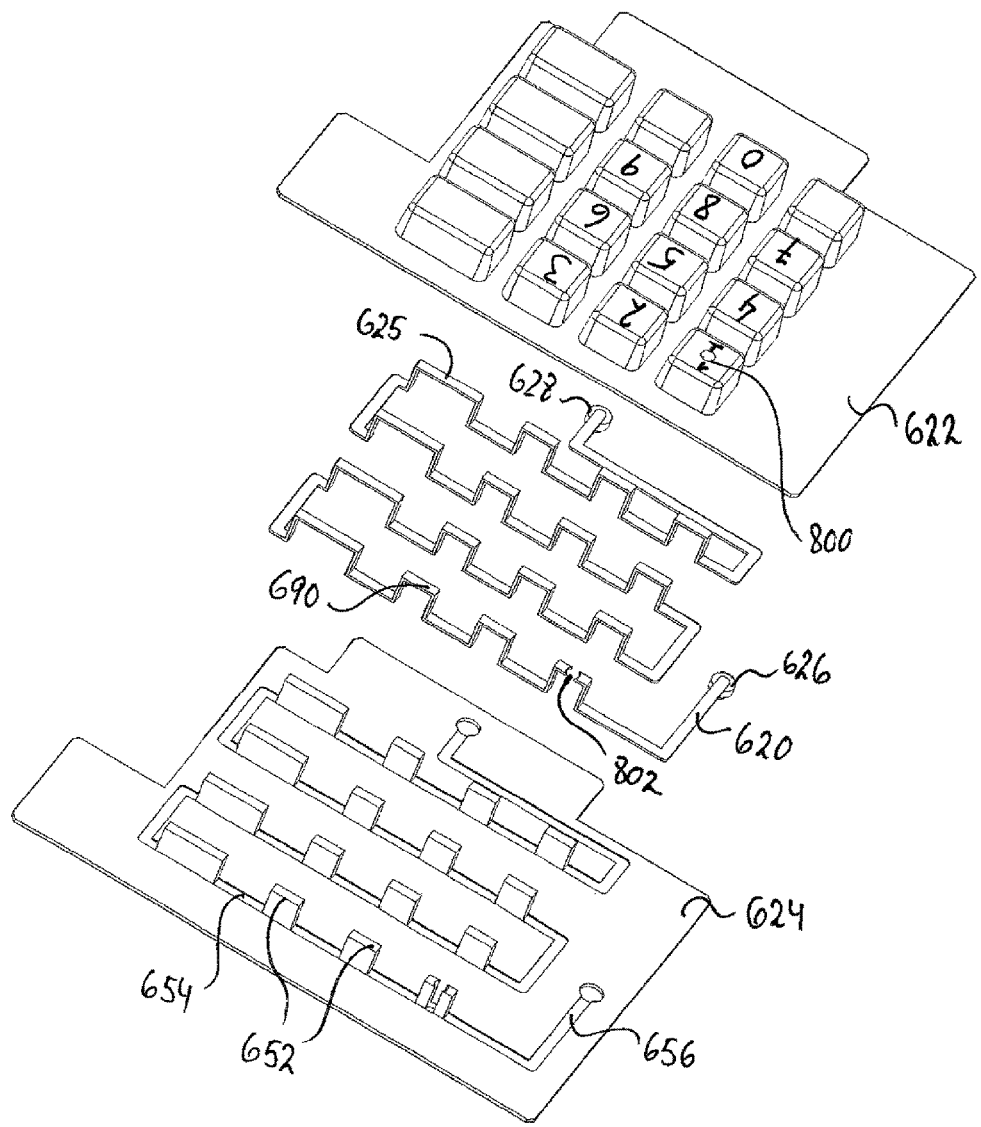

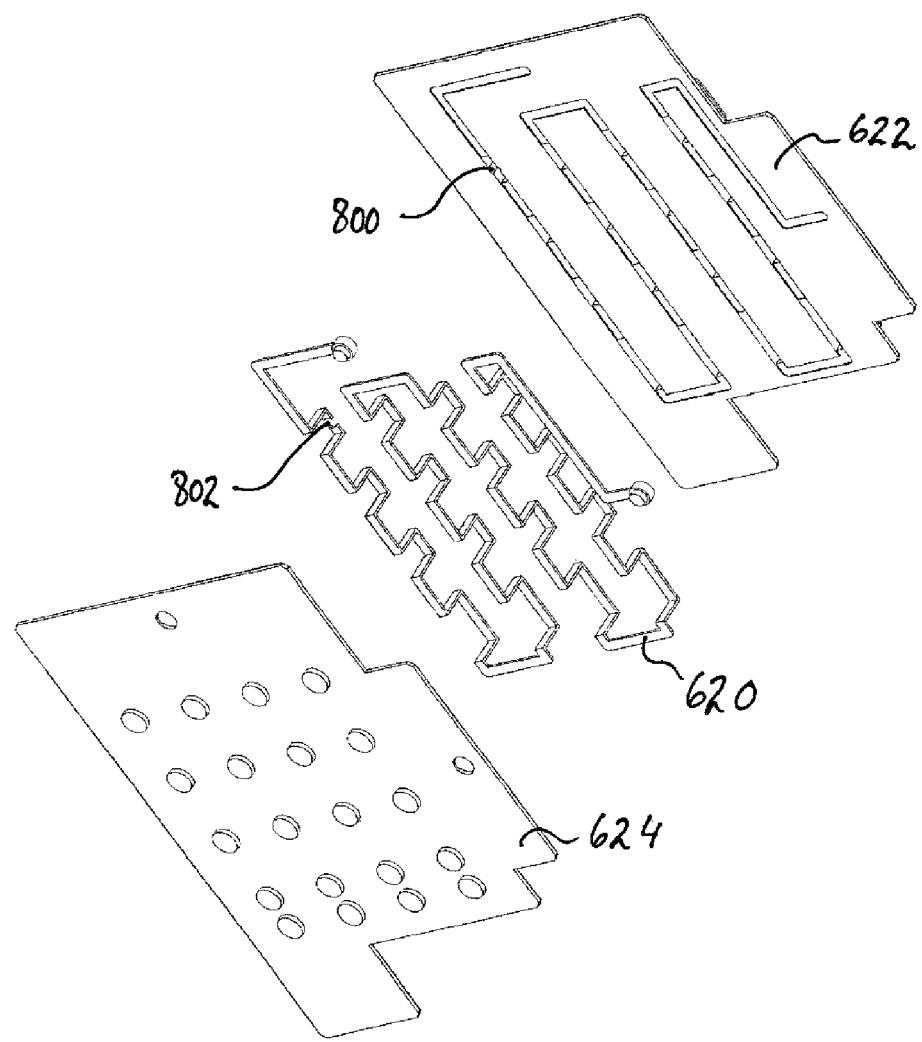

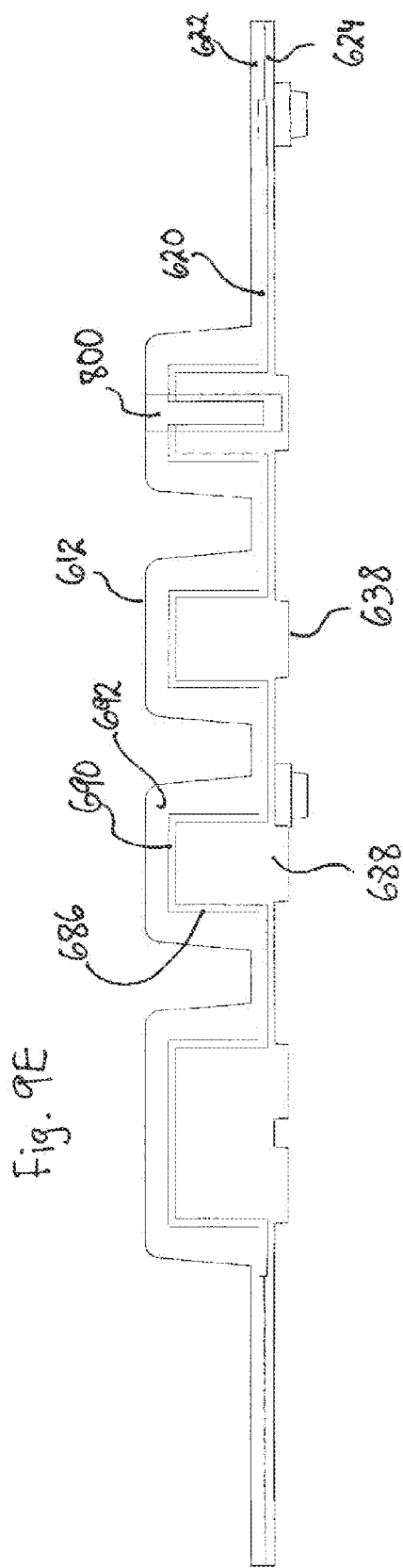

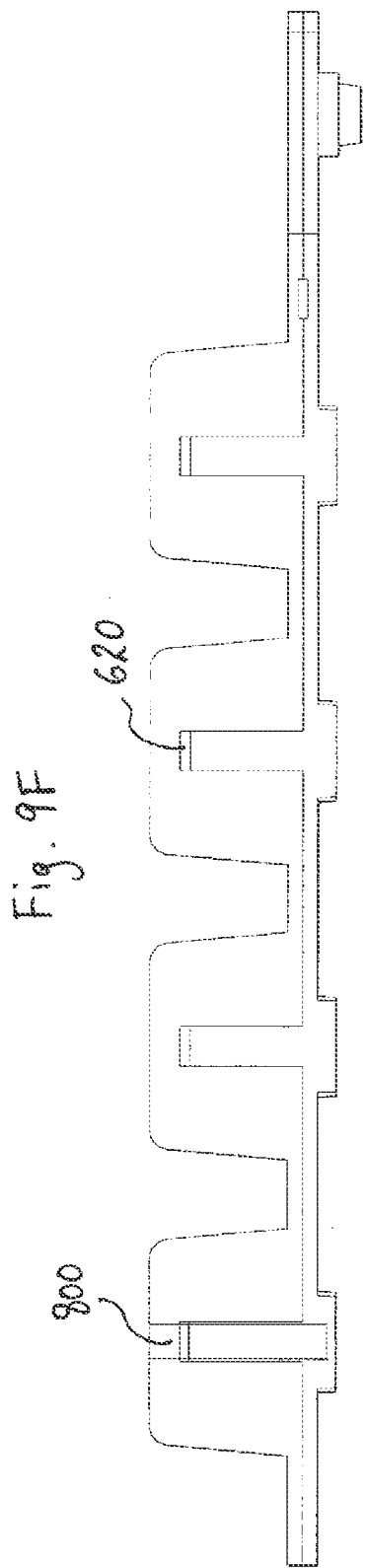

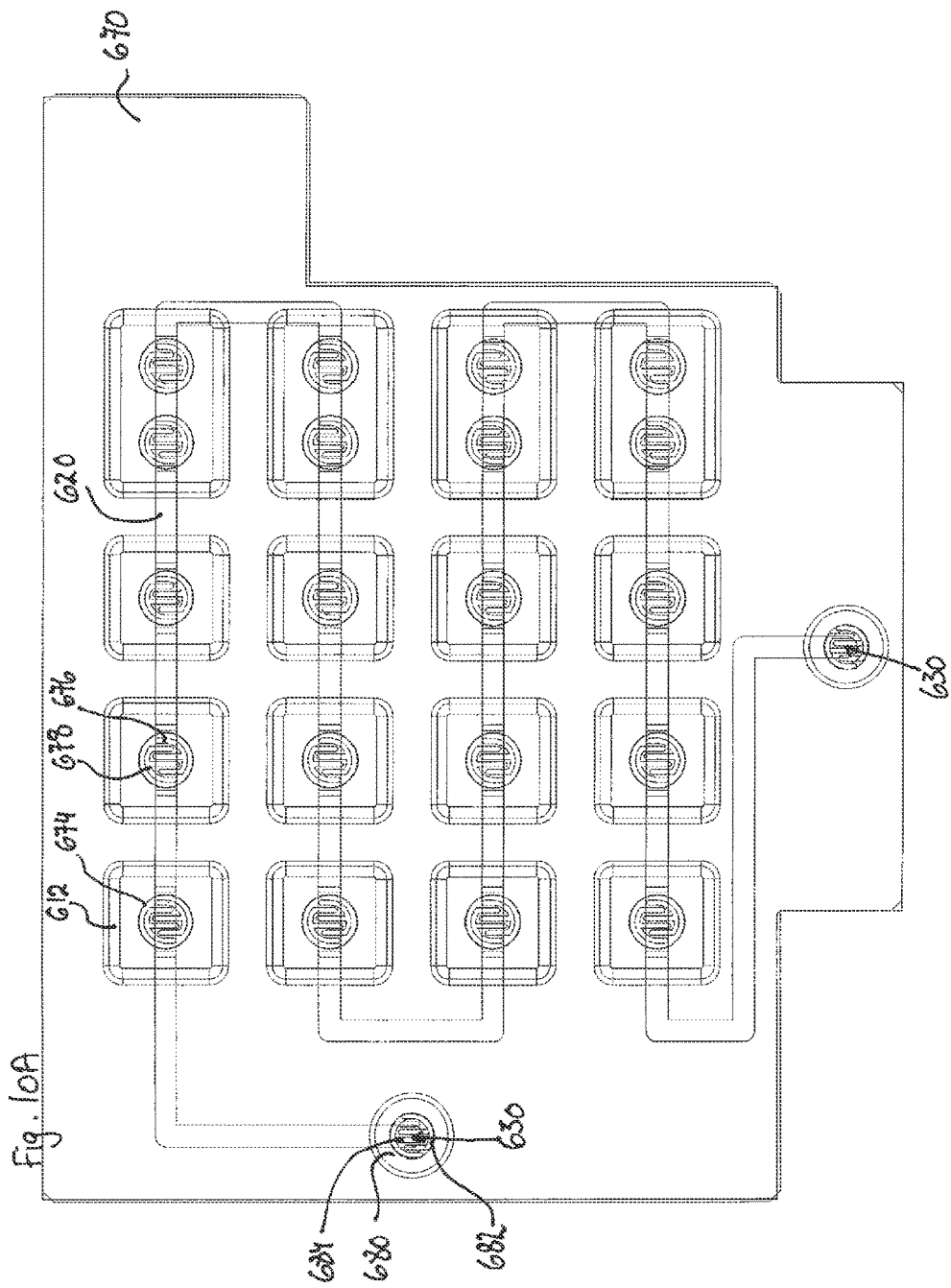

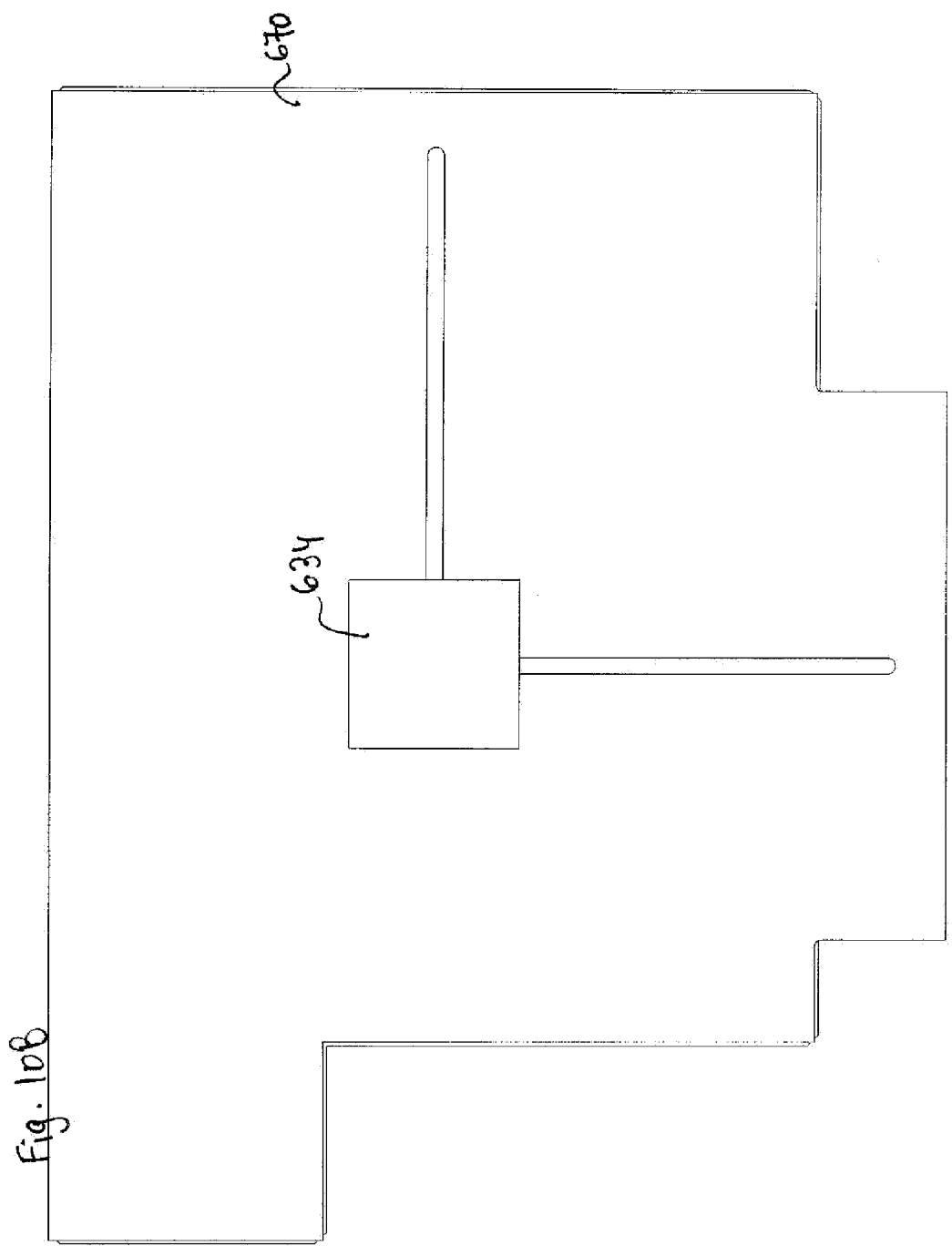

SECURE KEYPAD INCLUDING CONDUCTIVE TRACE

SUMMARY OF THE INVENTION

The present invention seeks to provide an improved secure keypad.

There is thus provided in accordance with an embodiment of the present invention a secure keypad including a housing, a keymat within the housing defining a plurality of depressible keys and including at least one conductive trace traversing at least some of the depressible keys, a key contact board within the housing and being cooperative with the keymat for providing data entry inputs responsive to depression of the depressible keys and a tamper detection circuit coupled to the conductive trace for providing an output indication of tampering with the keypad responsive to a change in the electrical characteristics of the conductive trace resulting from the tampering.

Preferably, the at least one conductive trace is generally two-dimensional.

In accordance with a preferred embodiment of the present invention the at least one conductive trace is generally three-dimensional. Additionally, the at least one conductive trace extends in multiple directions interiorly of at least some of the depressible keys.

Preferably, the at least one conductive trace is connected in series with a case open switch which senses opening of the housing and wherein the tamper detection circuit is also operative for providing an output indication of opening the housing.

In accordance with a preferred embodiment of the present invention the at least one conductive trace is molded within the keymat.

Preferably, the at least one conductive trace is not readily detected by visual inspection of the keymat.

In accordance with a preferred embodiment of the present invention the at least one conductive trace includes conductive silicone rubber.

BRIEF DESCRIPTION OF THE DRAWINGS

The present invention will be understood and appreciated more fully from the following detailed description, taken in conjunction with the drawings in which:

FIGS. 1A and 1B are simplified exploded view respective top-to-bottom facing and bottom-to-top facing illustrations of a secure keypad constructed and operative in accordance with one embodiment of the present invention in a disengaged operative orientation;

FIGS. 1C and 1D are simplified exploded view respective top-to-bottom facing and bottom-to-top facing illustrations of elements of a keymat forming part of the secure keypad of FIGS. 1A and 1B;

FIGS. 1E and 1F are simplified sectional illustrations of the keymat of FIGS. 1A-1D taken along lines E-E and F-F, respectively, in FIG. 1A;

FIGS. 2A and 2B are simplified exploded view respective top-to-bottom facing and bottom-to-top facing illustrations of the secure keypad of FIGS. 1A and 1B in an operative orientation in which one key is depressed;

FIGS. 2C and 2D are simplified exploded view respective top-to-bottom facing and bottom-to-top facing illustrations of elements of a keymat forming part of the secure keypad shown in FIGS. 2A and 2B;

FIGS. 3A and 3B are simplified sectional view illustrations, taken along lines IIIA-IIIA and IIIB-IIIB, respectively, in FIG. 2A;

FIGS. 4A and 4B are simplified exploded view respective top-to-bottom facing and bottom-to-top facing illustrations of the secure keypad of FIGS. 1A and 1B in a tampered condition;

FIGS. 4C and 4D are simplified exploded view respective top-to-bottom facing and bottom-to-top facing illustrations of elements of a keymat forming part of the secure keypad shown in FIGS. 4A and 4B;

FIGS. 4E and 4F are simplified sectional illustrations of the keymat shown in FIGS. 4A-4D taken along lines E-E and F-F, respectively, in FIG. 4A;

FIGS. 5A and 5B are simplified illustrations of respective top and bottom facing sides of portions of the secure keypad of FIGS. 1A-4F;

FIGS. 6A and 6B are simplified exploded view respective top-to-bottom facing and bottom-to-top facing illustrations of a secure keypad constructed and operative accordance with another embodiment of the present invention in a disengaged operative orientation;

FIGS. 6C and 6D are simplified exploded view respective top-to-bottom facing and bottom-to-top facing illustrations of elements of a keymat forming part of the secure keypad of FIGS. 6A and 6B;

FIGS. 6E and 6F are simplified sectional illustrations of the keymat of FIGS. 6A-6D taken along lines E-E and F-F, respectively, in FIG. 6A;

FIGS. 7A and 7B are simplified exploded view respective top-to-bottom facing and bottom-to-top facing illustrations of the secure keypad of FIGS. 6A and 6B in an operative orientation in which one key is depressed;

FIGS. 7C and 7D are simplified exploded view respective top-to-bottom facing and bottom-to-top facing illustrations of elements of a keymat forming part of the secure keypad shown in FIGS. 7A and 7B;

FIGS. 8A and 8B are simplified sectional view illustrations, taken along lines VIIIA-VIIIA and VIIIB-VIIIB, respectively, in FIG. 7A;

FIGS. 9A and 9B are simplified exploded view respective top-to-bottom facing and bottom-to-top facing illustrations of the secure keypad of FIGS. 6A and 6B in a tampered condition;

FIGS. 9C and 9D are simplified exploded view respective top-to-bottom facing and bottom-to-top facing illustrations of elements of a keymat forming part of the secure keypad shown in FIGS. 9A and 9B;

FIGS. 9E and 9F are simplified sectional illustrations of the keymat shown in FIGS. 9A-9D taken along lines E-E and F-F, respectively, in FIG. 9A; and FIGS. 10A and 10B are simplified illustrations of respective top and bottom facing sides of portions of the secure keypad of FIGS. 9A-9F.

DETAILED DESCRIPTION OF A PREFERRED EMBODIMENT

Figure 7C:
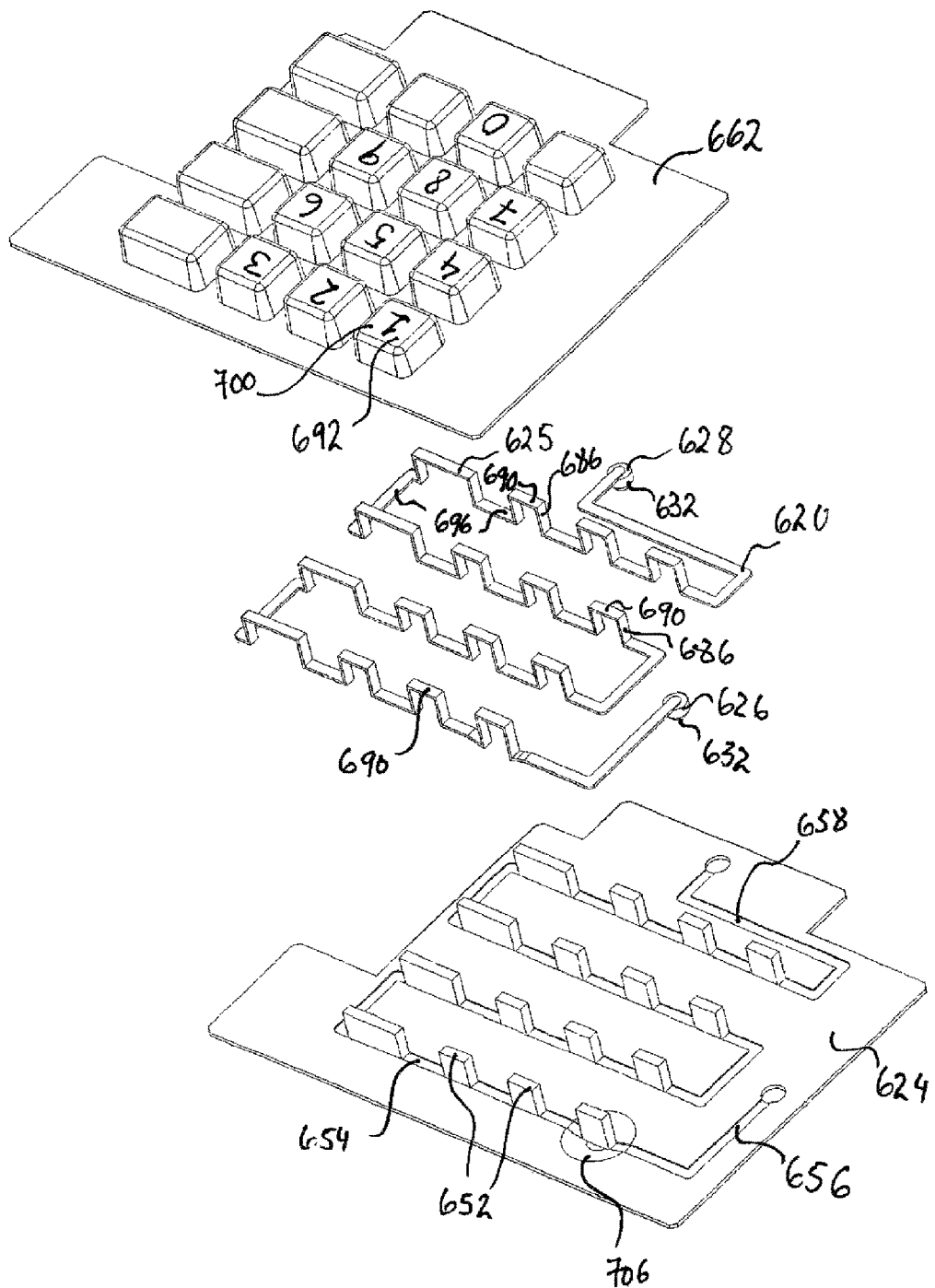

Reference is now made to FIGS. 1A-1F, which are simplified illustrations of a secure keypad constructed and operative accordance with one embodiment of the present invention in a disengaged operative orientation, and to FIGS. 5A and 5B, which are simplified illustrations of portions of the secure keypad of FIGS. 1A-1F.

As seen in FIGS. 1A-1F, 5A and 5B, there is seen a secure keypad 100, which preferably comprises a housing including a top housing portion 102 and a bottom housing portion 104. Located within the housing is a keymat 110, preferably formed of rubber or other flexible material, which defines a plurality of depressible keys 112.

It is a particular feature of an embodiment of the present invention that at least one conductive trace 120 forms part of the keymat 110. In the illustrated embodiment, the conductive trace 120 is preferably compression molded into the keymat between a top keymat portion 122 and a bottom keymat portion 124. As seen particularly in FIGS. 1C and 1D, it is seen that the bottom facing side of the top keymat portion 122 and the top facing side of the bottom keymat portion 124 are preferably formed with respective recesses 125 and 126, which accommodate trace 120.

In the illustrated embodiment of FIGS. 1A-1F, 5A and 5B, the conductive trace 120 is generally two-dimensional and extends underlying multiple depressible keys 112 from a first thickened boss 127 to a second thickened boss 128.

It is a further particular feature of an embodiment of the present invention that at least one of the first and second bosses 127 and 128 of the conductive trace 120 is associated with a case-open switch 130. Preferably the conductive trace 120 is connected in series with at least one, and preferably two, electrical contacts 132, which form part of case-open switches 130 and operatively connected to a tamper detection circuit 134 for sensing, by means of operation of a case open switch 130, opening of the housing and by virtue of a change in the electrical characteristics of the trace 120, tampering with the keymat 110.

Preferably the conductive trace 120 is formed of a conductive silicone rubber, preferably KE981, commercially available from Shin-Etsu Chemical Company Ltd. of Tokyo, Japan, and the top keymat portion 122 and the bottom keymat portion 124 are both formed of silicone rubber, preferably KE971 and KE951, commercially available from Shin-Etsu Chemical Company Ltd. of Tokyo, Japan. It is appreciated that the use of a conductive rubber trace 120 makes it difficult to attach a jumper to the trace, since it is not normally possible to solder metal to rubber. Preferably, the color of the silicone rubber used for the keymat 110 and the trace 120 is selected so that the trace is not readily detected by visual inspection.

It is seen particularly in FIGS. 1B, 1D and 1F, that the downward facing surface of the bottom keymat portion 124 is formed with an array of generally cylindrical flat bottomed protrusions 136, corresponding to the array of keys 112. The flat bottom surfaces of protrusions 136 of the bottom keymat portion 124 are preferably each formed with an electrically conductive material layer, such as a carbon pill 138.

Underlying the bottom keymat portion 122 is a spacer 140, preferably formed of metal and apertured to accommodate key travel therethrough. Spacer 140 is also preferably provided with case open switch accommodating apertures 142.

A main printed circuit board 170 is disposed below spacer 140 and preferably includes an array 172 of key engagement contact assemblies 174, each of which includes at least two contacts 176 and 178, which are typically shorted by key depression, which brings carbon pill 138 into electrical engagement with both contacts 176 and 178.

Preferably, there are also formed at least one, and preferably two, case open switch contact assemblies 180, which form part of case open switches 130, each including at least two contacts 182 and 184. Contracts 182 and 184 of assemblies 180 are normally shorted by respective ones of bosses 127 and 128, when the top housing portion 102 and a bottom housing portion 104 are in a mutually closed orientation, thereby providing the functionality of case open switches in series with trace 120 and in operative communication with tamper detection circuit 134.

Reference is now made to FIGS. 2A-2D, which are simplified illustrations of the secure keypad of FIGS. 1A-1E in an operative orientation in which one key is depressed, and to FIGS. 3A & 3B, which are simplified sectional view illustrations, taken along respective lines IIIA-IIIA and IIIB-IIIB in FIG. 2A.

As seen in FIGS. 2A-3B, when a key, such as the "1" key, is depressed, the upward facing protrusion 200 of the "1" key is displaced downwardly, thereby causing a downward facing deformation 202 at the underside of the upper keymat portion 122, causing a downward facing deformation 204 in the flexible conductive trace 120 and producing a corresponding downward facing deformation 206 in the bottom keymat portion 124 and downward displacement of the corresponding protrusion 136 and carbon pill 138.

The deformed portion of bottom keymat portion 124 at deformation 206 extends through an aperture 208 in spacer 140, thereby bringing the corresponding protrusion 136 and carbon pill 138 into electrical shorting contact with contacts 176 and 178 of a corresponding key engagement contact assembly 174, thereby registering key engagement of the "1" key.

Reference is now made to FIGS. 4A-4F, which are simplified illustrations of the secure keypad of FIGS. 1A-1F in a tampered condition.

As seen in FIGS. 4A-4F, when the keypad is tampered with, for example by drilling a hole 300 in the "1" key, a cut 302 is formed in the conductive trace 120 thus changing the electrical characteristics thereof. This change is sensed by the tamper detection circuitry 134. The tamper detection circuitry 134 may be responsive to sensed tampering as by the above-described drilling or by opening of the housing to provide one or more responses including, for example, an alarm indication to a remote location, an audible or visual alarm indication or an automatic erasure of sensitive data.

Reference is now made to FIGS. 6A-6F, which are simplified illustrations of a secure keypad constructed and operative accordance with another embodiment of the present invention in a disengaged operative orientation, and to FIGS. 10A & 10B, which are simplified illustrations of portions of the secure keypad of FIGS. 6A and 6B.

As seen in FIGS. 6A-6F, 10A & 10B, there is seen a secure keypad 600, which preferably comprises a housing, including a top housing portion 602 and a bottom housing portion 604. Located within the housing is a keymat 610, preferably formed of rubber or other flexible material, which defines a plurality of depressible keys 612.

It is a particular feature of an embodiment of the present invention that at least one conductive trace 620 forms part of the keymat 610. In the illustrated embodiment, the conductive trace 620 is preferably compression molded into the keymat between a top keymat portion 622 and a bottom keymat portion 624.

In the illustrated embodiment of FIGS. 6A-10B, the conductive trace 620 is generally three-dimensional and extends from the base of each of a plurality of keys upward inside the key, including portions 625 extending across and underlying the top of the key, preferably in a manner which is not visually sensible from a visual inspection of the keypad, and back down to the base of each key. Preferably the trace is continuous in this manner underlying multiple depressible keys 612 from a first thickened boss 626 to a second thickened boss 628.

It is a further particular feature of an embodiment of the present invention that at least one of the first and second bosses 626 and 628 of the conductive trace 620 is associated with a case-open switch 630. Preferably the conductive trace 620 is connected in series with at least one and preferably two electrical contacts 632, which form part of case-open switches 630 and operatively connected to a tamper detection circuit 634 for sensing, by means of operation of a case open switch 630, opening of the housing and by virtue of a change in the electrical characteristics of the trace 620, tampering with the keymat 610.

Preferably the conductive trace is formed of a conductive silicone rubber, preferably KE981, commercially available from Shin-Etsu Chemical Company Ltd. of Tokyo, Japan, and the top keymat portion 622 and bottom keymat portion 624 are both formed of silicone rubber, preferably KE971 and KE951, commercially available from Shin-Etsu Chemical Company Ltd. of Tokyo, Japan. It is appreciated that the use of a conductive rubber trace 620 makes it difficult to attach a jumper to the trace, since it is not normally possible to solder metal to rubber. Preferably, the color of the silicone rubber used for the keymat 610 and the trace 620 is selected so that the trace is not readily detected by visual inspection.

It is seen particularly in FIGS. 6B, 6D and 6F, that the downward facing surface of the bottom keymat portion 624 is formed with an array of generally cylindrical flat bottomed protrusions 636, corresponding to the array of keys 612 The flat bottom surfaces of protrusions 636 of the bottom keymat portion 624 are preferably each formed with an electrically conductive material layer, such as a carbon pill 638.

As seen particularly in FIGS. 6D, 6E and 6F, it is seen that the bottom facing side of the top keymat portion 622 is formed with a recess 640 having differing depths therealong. It is seen that the depth of the recess 640 at locations 642 underlying each of keys 612 is significantly greater than the depth of the recess 640 at locations 644 intermediate keys 612 and at locations 646 and 648 intermediate keys 612 and respective first and second bosses 626 and 628.

As seen particularly in FIGS. 6C, 6E and 6F, it is seen that the top facing side of the bottom keymat portion 624 is formed with a chain 650 of alternating protrusions 652 and recesses 654. It is seen that the protrusions 652 underlie each of keys 612 and the corresponding portions of the trace 620 thereat, while the recesses 654 are located intermediate protrusions 652. Additional recesses 656 and 658 are located intermediate keys 612 and respective first and second bosses 626 and 628.

Underlying the bottom keymat portion 622 is a spacer 660, preferably formed of metal and apertured to accommodate key travel therethrough. Spacer 660 is also preferably provided with case open switch accommodating apertures 662.

A main printed circuit board 670 is disposed below spacer 660 and preferably includes an array 672 of key engagement contact assemblies 674, each of which includes at least two contacts 676 and 678, which are typically shorted by key depression, which brings a carbon pill 638 into electrical engagement with both contacts 676 and 678.

Preferably there are also formed at least one, and preferably two, case open switch contact assemblies 680, which form part of case open switches 630, each including at least two contacts 682 and 684. Contracts 682 and 684 of assemblies 680 are normally shorted by respective ones of bosses 626 and 628, when the top housing portion 602 and a bottom housing portion 604 are in a mutually closed orientation, thereby providing the functionality of case open switches in series with trace 620 and in operative communication with tamper detection circuit 634.

Reference is now made to FIGS. 7A and 7D, which are simplified exploded view respective top-to-bottom facing and bottom-to-top facing illustrations of the secure keypad of FIGS. 6A-6F in an operative orientation in which one key is depressed, and to FIGS. 8A and 8B, which is a simplified sectional view illustration, taken along respective lines VIIIA-VIIIA and VIIIB-VIIIB in FIG. 7A.

As seen in FIGS. 7A-8B, the conductive trace 620 is generally three-dimensional and includes portions 686, which extend from opposite sides of the base 688 of each of a plurality of keys 612 upward inside the key, and a continuing portion 690, extending across and underlying the top 692 of the key, preferably in a manner which is not visually sensible from a visual inspection of the keypad. Preferably the trace is continuous in this manner including continuing portions 696 extending between adjacent keys 612 from first thickened boss 626 to a second thickened boss 628.

It is appreciated that the embodiment of FIGS. 6A-10 has an advantage in that the trace 620 is located adjacent to the top of each key, such that removal of the top of a key, as in an attempt to insert a bug into the key, will be readily sensed as tampering.

It is seen that when a key, such as the "1" key, is depressed, the upward facing protrusion 700 of the "1" key is displaced downwardly, thereby causing a downward facing deformation 702 at the underside of the upper keymat portion 622, causing a downward facing deformation 704 in the flexible conductive trace 620 and producing a corresponding downward facing deformation 706 in the bottom keymat portion 624 and downward displacement of a corresponding protrusion 636 and carbon pill 638.

The deformed portion of bottom keymat portion 624 at deformation 706 extends through an aperture 708 in spacer 660 and brings a corresponding carbon pill 638 into electrical shorting contact with contacts 676 and 678 of a corresponding key engagement contact assembly 674, thereby registering key engagement of the "1" key.

Reference is now made to FIGS. 9A-9D, which are simplified exploded view respective top-to-bottom facing and bottom-to-top facing illustrations of the secure keypad of FIGS. 6A-6F in a tampered condition.

As seen in FIGS. 9A-9D, when the keypad is tampered with, for example by drilling a hole 800 in the top of the "1" key, a cut 802 is formed in the conductive trace 620 thus changing the electrical characteristics thereof. This change is sensed by the tamper detection circuitry 634. The tamper detection circuitry 634 may be responsive to sensed tampering as by the above-described drilling or by opening of the housing to provide one or more responses including, for example, an alarm indication to a remote location, an audible or visual alarm indication or an automatic erasure of sensitive data.

It will be appreciated by persons skilled in the art that the present invention is not limited by what has been particularly claimed and includes both combinations and subcombinations of features described and shown hereinabove as well as modifications thereof which are not in the prior art.

The invention claimed is:

1. A secure keypad comprising:
    a housing;
    a keymat within said housing defining a plurality of depressible keys and including at least one continuous conductive trace integrated with the keymat and traversing at least some of said plurality of depressible keys, said at least one continuous conductive trace including a three-dimensional portion that is configured to extend upward from a base portion, extend along at least one side wall of the depressible key, and further extends across and underlies a top portion of the depressible key, and then extends along a second side wall of the depressible key, wherein the extending occurs inside of one or more of said plurality of depressible keys;

a key contact board within said housing and being cooperative with said keymat for providing data entry inputs responsive to depression of said depressible keys; and a tamper detection circuit coupled to said conductive trace for providing an output indication of tampering with said keypad responsive to a change in the electrical characteristics of said at least one continuous conductive trace resulting from said tampering.

2. The secure keypad according to claim 1 and wherein said at least one continuous conductive trace is connected in series with a case open switch which senses opening of said housing and wherein said tamper detection circuit is also operative for providing output indication of opening said housing.

3. The secure keypad according to claim 1 and wherein:
said keymat includes:
a top keymat portion;
a bottom keymat portion; and
said at least one conductive trace; and
said at least one continous conductive trace is molded within said keymat between said top keymat portion and said bottom keymat portion.

4. The secure keypad according to claim 1 and wherein said at least one continuous conductive trace is not readily detected by visual inspection of said keymat.

5. The secure keypad according to claim 1 and wherein said at least one continuous conductive trace comprises conductive silicone rubber.

* * * * *